PBX DIAL CONFERENCE TRUNK CIRCUIT

Filed March 31, 1964 7 Sheets-Sheet 1

INVENTOR
D. R. TRIMMER
BY
I. A. McCorkendale
ATTORNEY

PBX DIAL CONFERENCE TRUNK CIRCUIT

May 30, 1967 D. R. TRIMMER 3,322,901

PBX DIAL CONFERENCE TRUNK CIRCUIT

Filed March 31, 1964 7 Sheets-Sheet 3

PBX DIAL CONFERENCE TRUNK CIRCUIT 3,322,901
PBX DIAL CONFERENCE TRUNK CIRCUIT
Daniel R. Trimmer, Los Angeles, Calif., assignor to American Telephone and Telegraph Company, New York, N.Y., a corporation of New York
Filed Mar. 31, 1964, Ser. No. 356,150
24 Claims. (Cl. 179—27)

ABSTRACT OF THE DISCLOSURE

A common multiport transistorized conference amplifier is utilized in a customer controlled conference arrangement operating in conjunction with a telephone private branch exchange. The conference originator may set up a conference connection with other PBX stations to the full port-capacity or may have a central office trunk included in place of one PBX station. If the conference originator leaves the conference loop, and provided one additional conferee has also gone on-hook, any one of the remaining conferees may assume conference controller status by a momentary operation of their respective switchhook.

This invention relates to a private branch exchange telephone system and more particularly to a private branch exchange telephone system which includes conference facilities.

In instances where a telephone customer, for example, a business firm, a Government agency, or the like, requires a relatively large number of extensions, it is the unusual practice to provide on the premises, or conveniently located thereto, a private branch exchange commonly referred to as a PBX. The larger PBX's are usually served by one or more attendants from a console or attendant's position and function essentially as a small telephone central office in that intrastation calls between extensions on the premises are completed through the PBX as well as calls from the extensions to subscribers served through remote central offices and calls from such subscribers to extensions served by the PBX. A PBX of the type capable of serving a relatively large number of extensions and providing many advanced features is disclosed in Patent 2,904,637, issued Sept. 15, 1959, to R. D. Williams.

It is fairly common practice to provide in connection with the PBX, conference facilities by means of which several of the extension stations may be connected together in a common loop for communication with each other and, on occasion, such a conference setup may be connected to an outside line through the PBX. For purposes of efficiency and convenience, it is desirable that the PBX subscribers themselves be able to initiate and control the conference independently of the attendant. However, in this connection, it is important for obvious reasons that the subscribers do not usurp certain of the operations normally reserved to the attendant, particularly the act of calling a remote subscriber over a central office trunk and subsequent connection of the trunk to the conference loop. Nevertheless, it is desirable that, when the subscriber controlling the conference so wishes, a remote subscriber may be called over a trunk and added to the conference loop. The subscriber controlling the conference should, however, have complete control over the initiation of such action.

Accordingly, it is an object of the invention to improve the operation of PBX's.

Another object of the invention is to enhance and improve conference facilities associated with a PBX.

A further object of the invention is to make feasible the initiation and control of a conference connection by a PBX subscriber.

Yet another object of the invention is to prevent the connection of a central office trunk to the conference loop solely by subscriber action.

An additional object of the invention is to prevent the connection of a central office trunk to the conference loop solely by attendant action.

A still further object of the invention is to make possible the connection of a central office trunk to the conference loop through attendant action after such action has been initiated by subscriber action.

Still another object of the invention is to permit under certain conditions to transfer of conference control from one station to another.

In the subsequent description, the terms "PBX station" and "extension" may be used interchangeably referring to the station sets of the PBX, and the terms "subscribers" and "customers" may be used interchangeably in referring to persons served thereby.

In accordance with a specific embodiment of the invention, a customer controlled conference arrangement, operating in conjunction with a crossbar PBX, permits any of the PBX terminated stations to set up a conference connection with any five other such stations or with any four other such stations and a central office trunk. The arrangement utilizes as a common "conference amplifier" a 6-port transistorized amplifier circuit.

The six conference ports are arbitrarily assigned to any six tie trunk verticals of the crossbar link, the number of the vertical assigned to conference port "0" being the calling code for originating a conference. The conference originator adds conferee stations to the conference connection one at a time by dialing the respective numbers, a momentary "flash" of his switchhook after each addition placing his station in condition for the next addition.

A central office trunk can be added to the conference connection at the last port instead of the fifth local conferee station, but this can be done only by attendant action and only after such action has been initiated by the conference originator, or "conference controller," by dialing "0."

After the conference loop has been established, should the conference originator and any one additional conferee leave the conference loop by going on-hook, any one of the remaining conferees may gain conference controller status by a "flash" of his switchhook.

A feature of the invention is a novel terminating arrangement wherein respective conference ports are terminated on selected verticals of a crossbar switch.

Another feature of the invention is a relay chain circuit effective to connect respective switch verticals in turn to a dial pulse register as the conference loop is being set up.

Still another feature of the invention is a second relay chain circuit effective to complete in sequence paths between each conference port and the associated conference amplifier port as the conference loop is being set up.

Yet another feature of the invention is a novel relay circuit effective under control of the conference originator to permit connection of a central office trunk by the attendant to a conference port normally unavailable for such connection.

A full understanding of the arrangement contemplated by the present invention as well as an appreciation of the various advantageous features thereof may be gained from consideration of the following detailed description in connection with the accompanying drawing in which.

Figure 1:
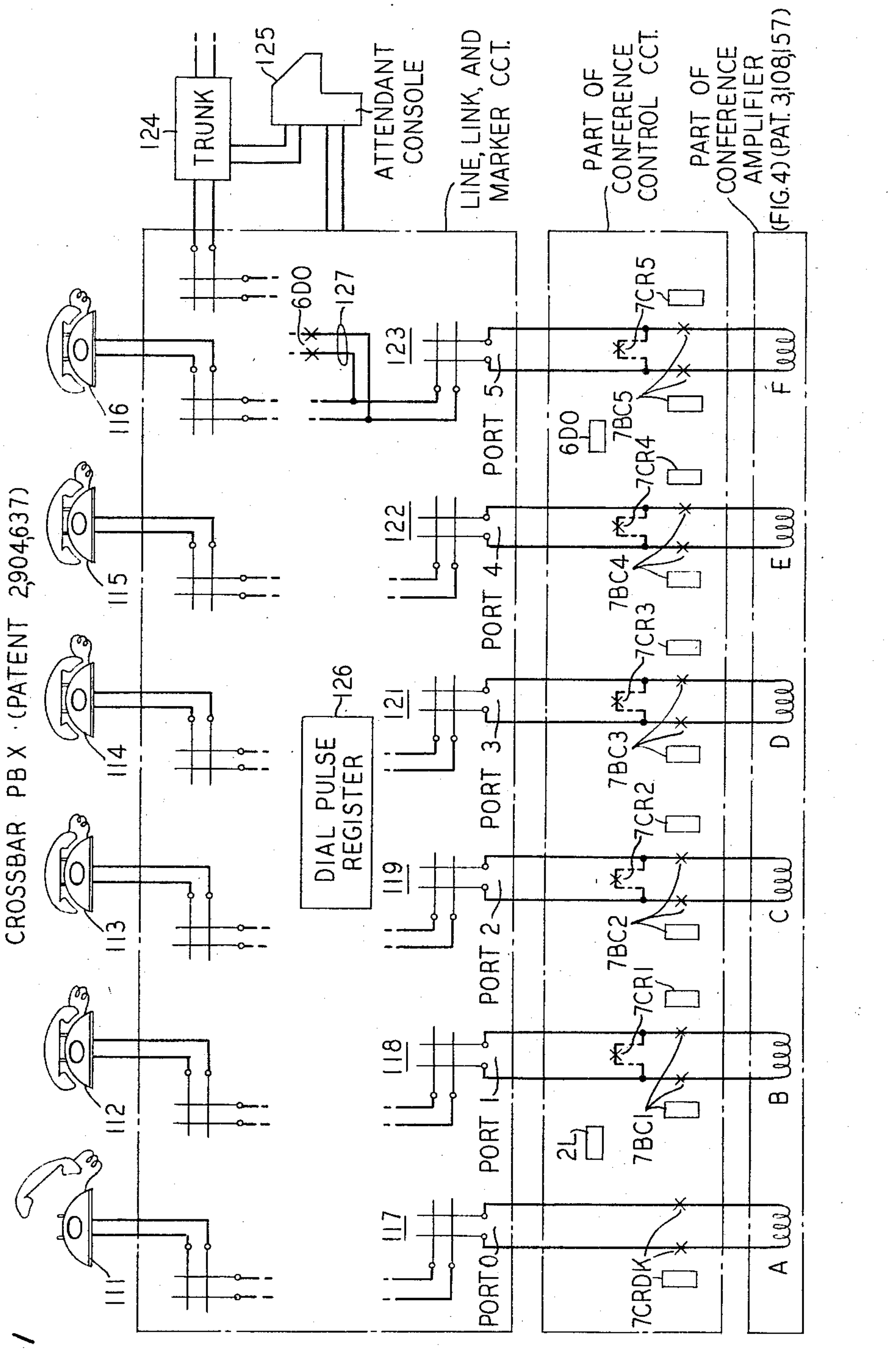
FIG. 1 shows schematically the arrangement and relationship of certain of the basic individual circuits which comprise one specific illustrative embodiment of the PBX system contemplated by the invention.
Figure 2:
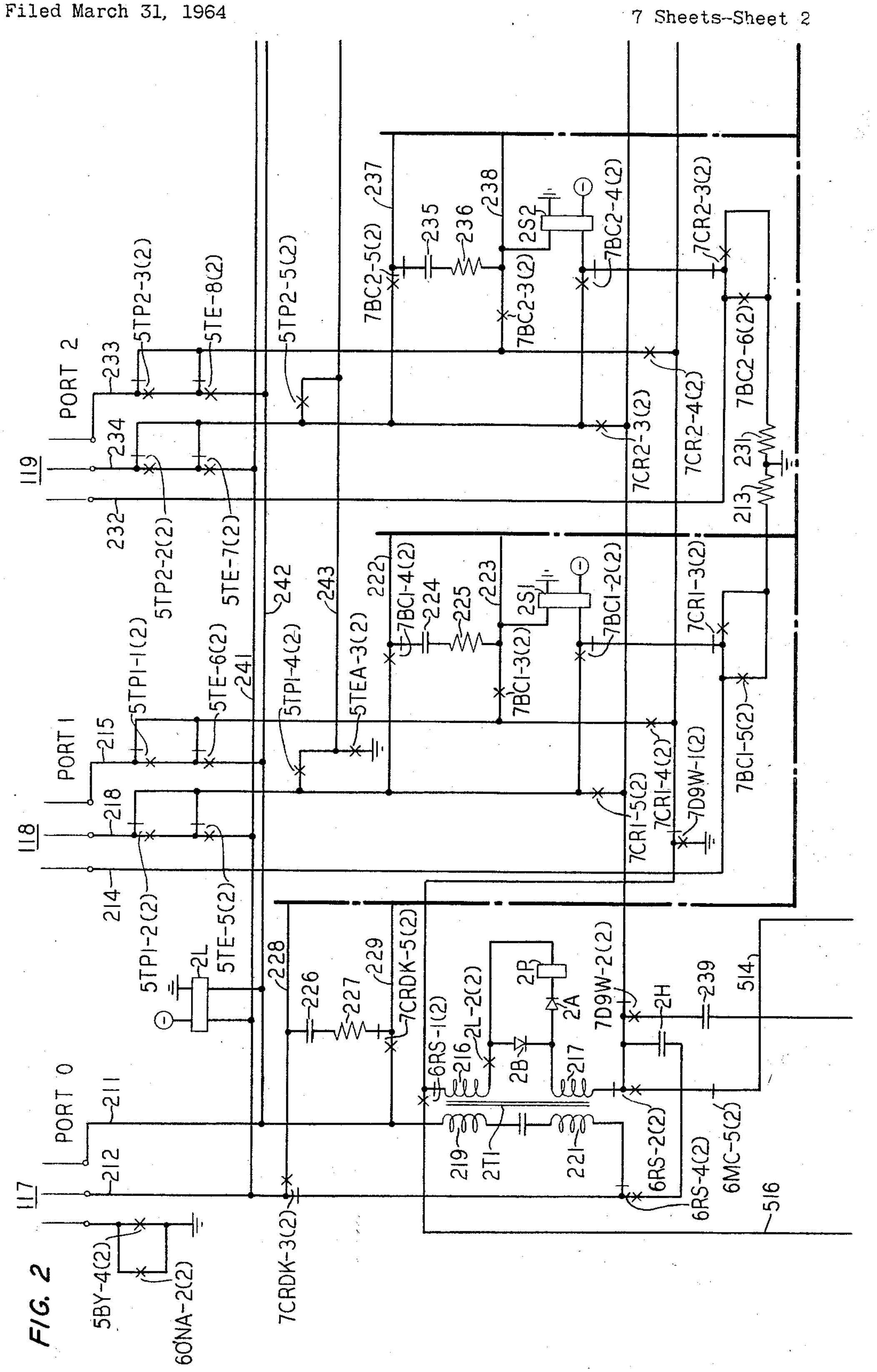
FIGS. 2 and 3 show particularly the connection of the espective conference calling ports to the respectively ssigned crossbar switch verticals.
Figure 3:
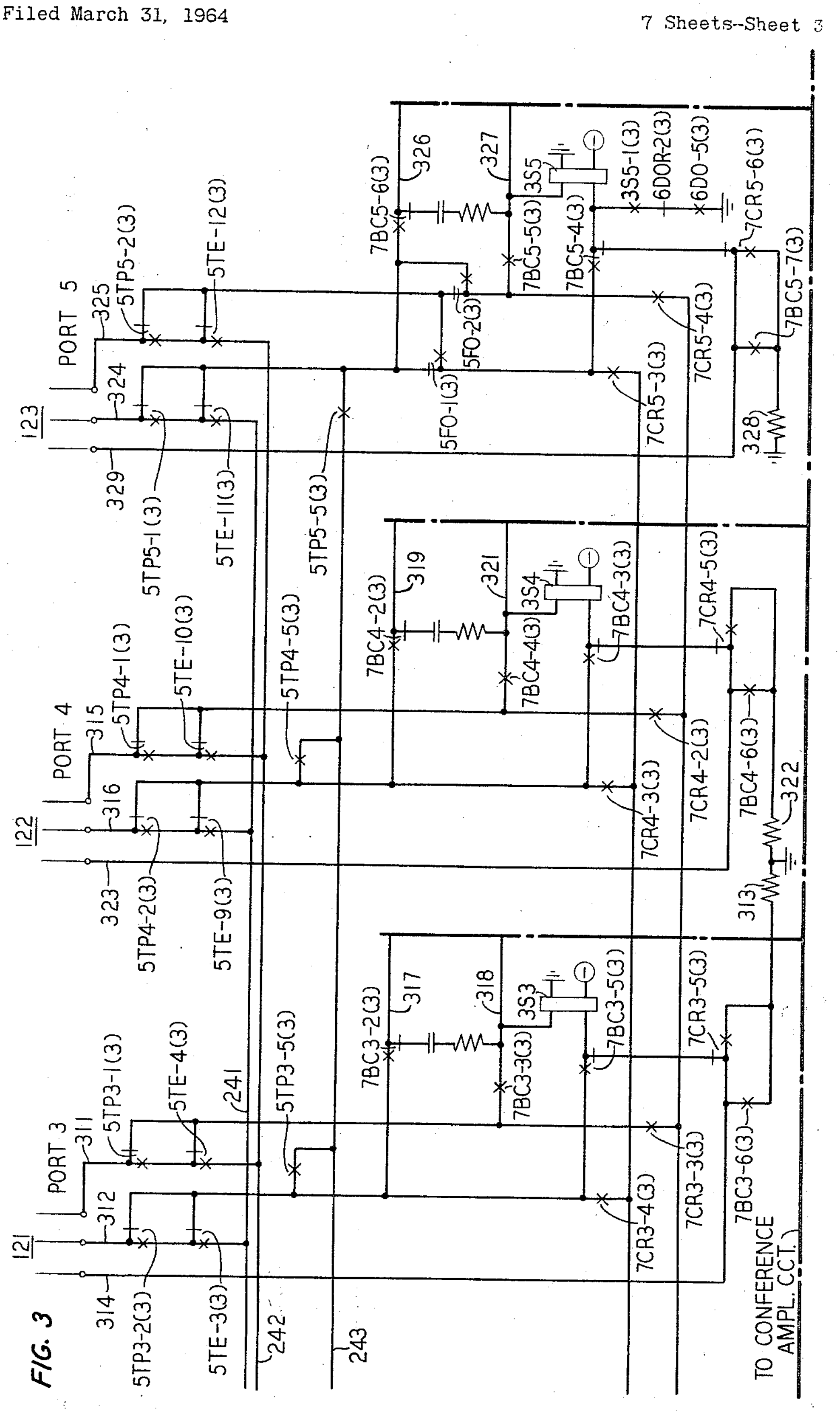

The arrangement and operation of the various compoients of the illustrative embodiment of the invention will e described in detail subsequently with reference to FIGS. to 7. However, in order to first gain a general over-all inderstanding of the arrangement contemplated, a brief ;eneral description will be given at this time with refernce to FIG. 1. Referring, therefore, to FIG. 1, portions of a crossbar PBX are shown in highly schematic form; it vill be assumed for purposes of simplified disclosure that he PBX follows the general arrangement described in deail in R. D. Williams Patent 2,904,637, issued Sept. 15, 959. The conference circuit contemplated by the resent invention is particularly adapted to use in onjunction with the basic switching and controlling circuits fully described in the Williams patent and such circuits will be described in the present disclosure only to he extent necessary for full understanding of the present invention.

A PBX of the type referred to ordinarily serves a large number of PBX stations or extensions, for example, in a ypical installation from 60 to 70 stations may be served. Six PBX customer stations 111, 112, 113, 114, 115, and 16 are shown in FIG. 1, which stations should be taken merely as representative of all the stations of the PBX. The stations are associated with the line, link and marker circuit of the PBX in the normal manner as fully set forth in the Williams Patent 2,904,637 referred to above.

Figure 4:
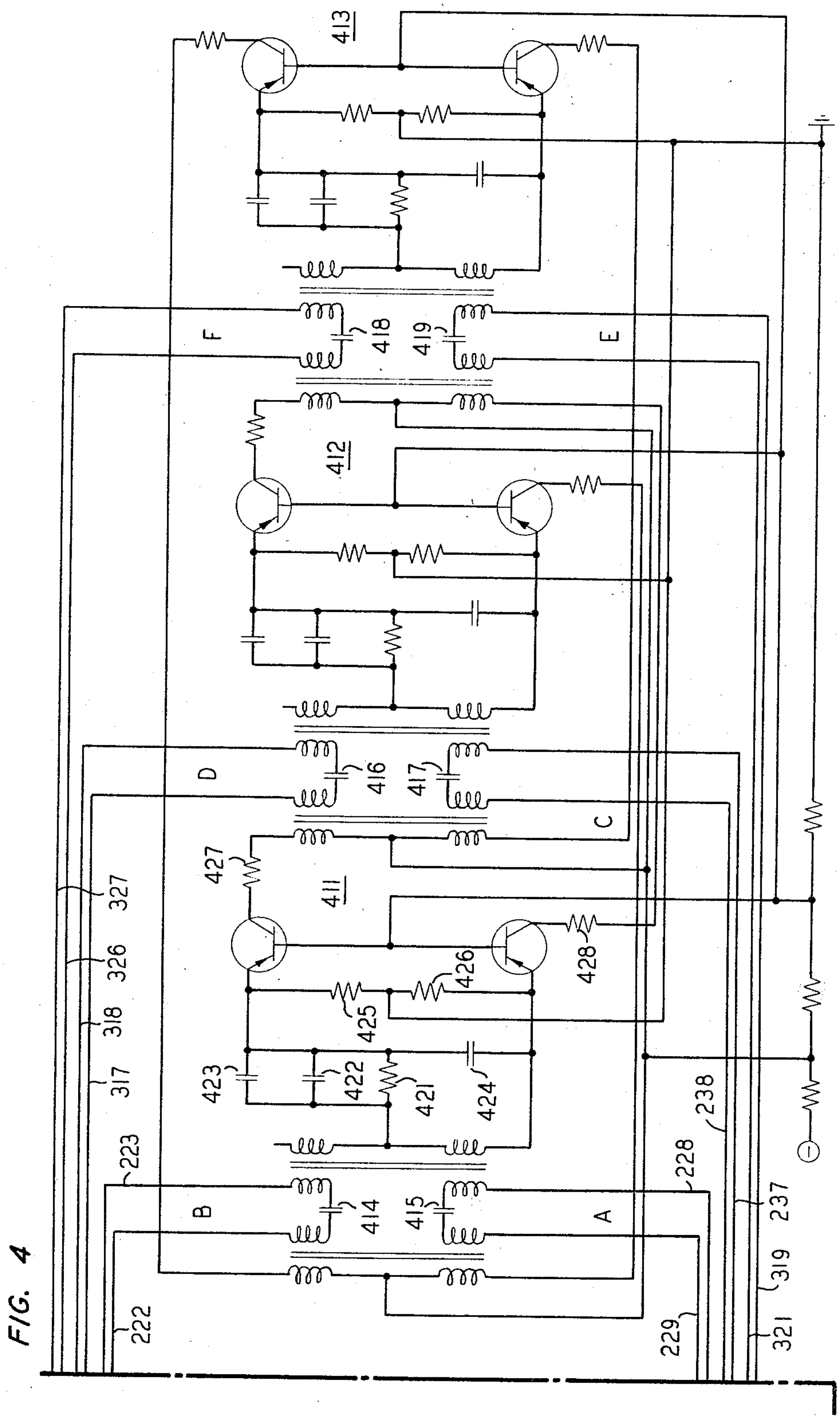
FIG. 4 shows a 6-port conference amplifier of a type articularly adapted to use in the contemplated confernce arrangements.
Figure 5:
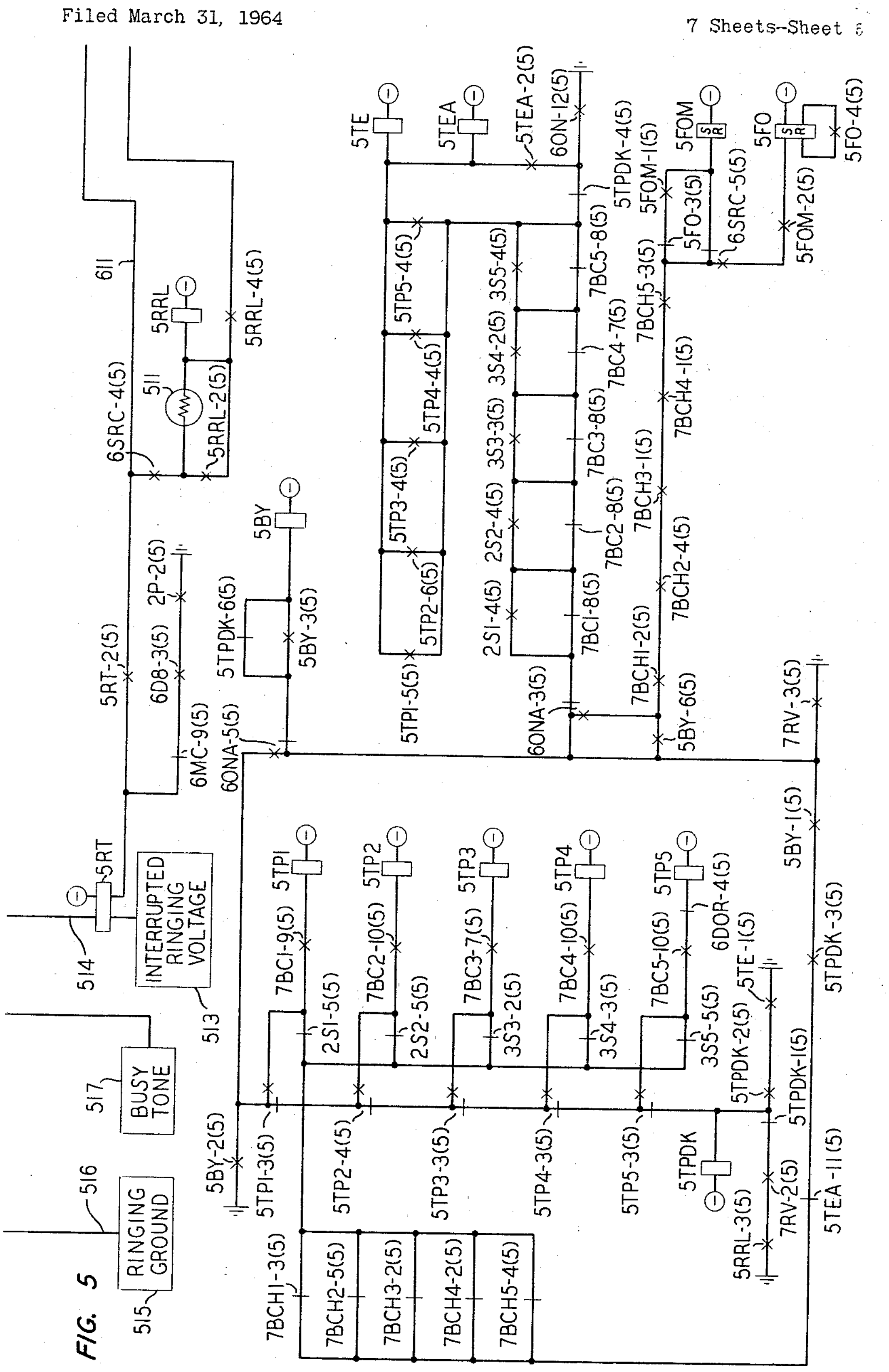
FIG. 5 shows particularly the ringing and transfer conrol circuits.
Figure 6:
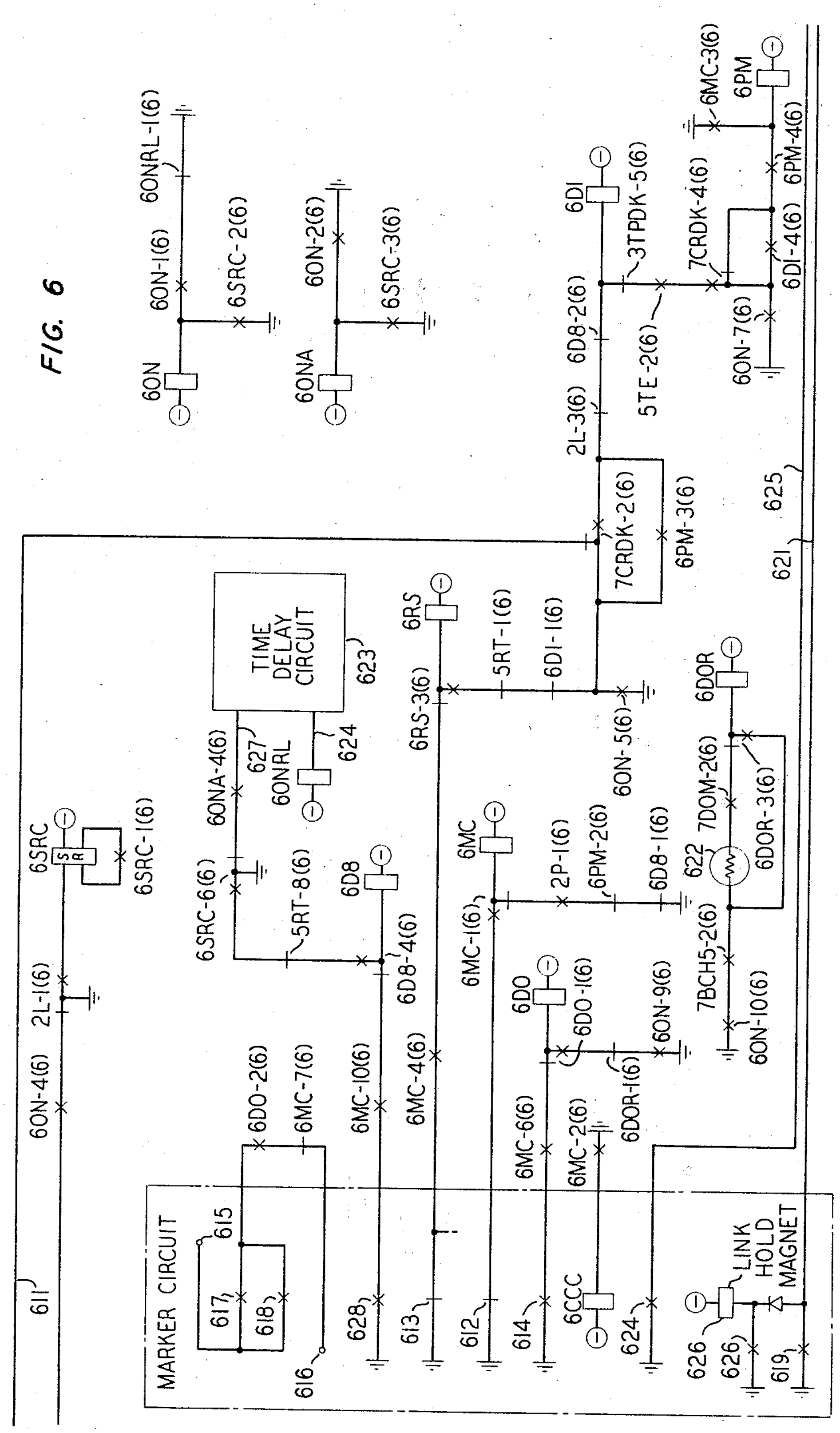
FIG. 6 shows particularly the off-normal circuit, porions of the marker, and relay circuits involved in calls o the attendant.
Figures 7, 8:
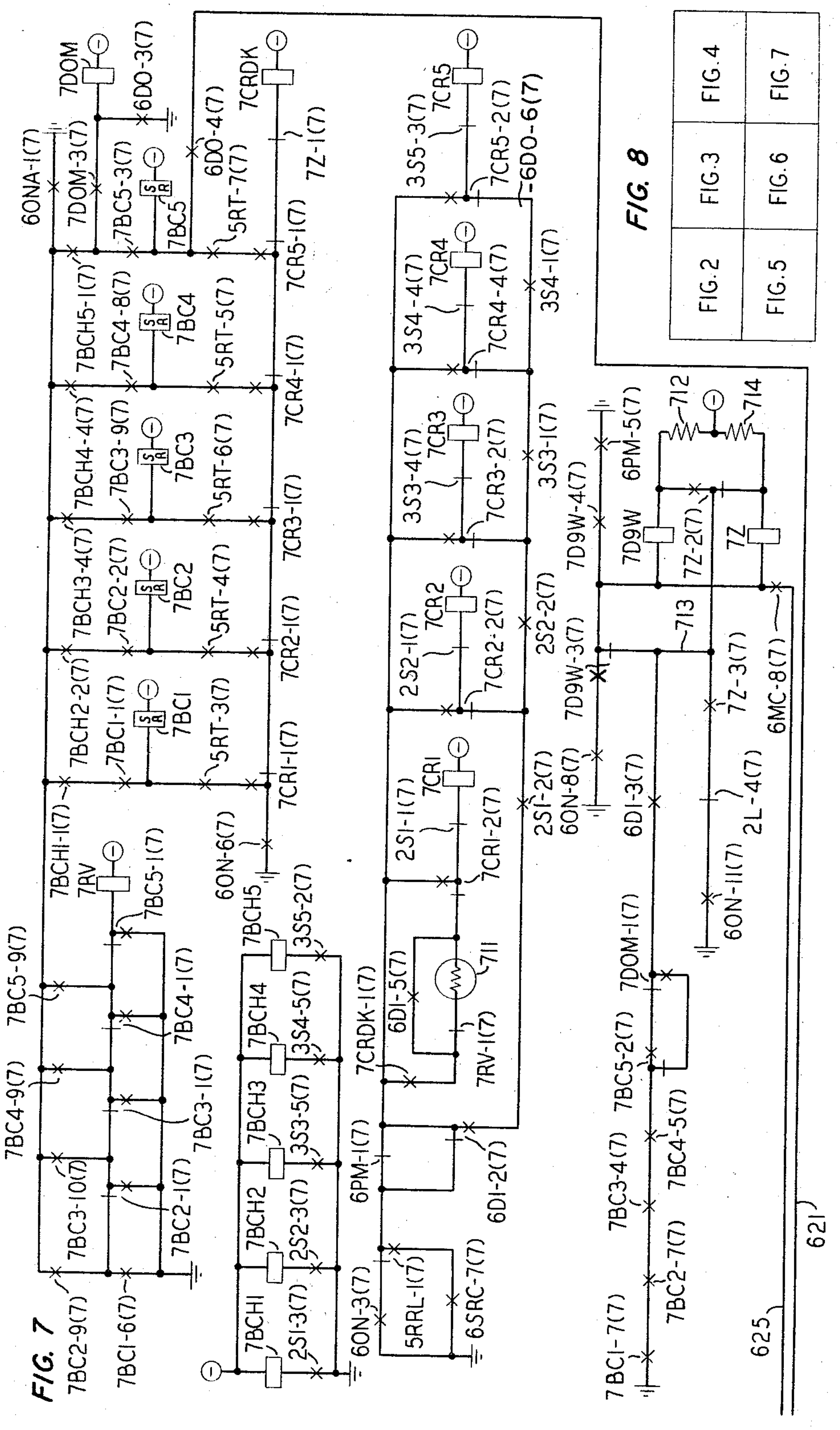
FIG. 7 shows particularly the "connect register" and bus connect" relay chain circuits.
FIG. 8 shows the manner in which certain of the figres should be arranged to show the specific illustrative mbodiment of the invention.

The conference arrangement utilizes as a conference amplifier, a 6-port transistorized conference amplifier of the general nature disclosed in A. Feiner Patent 3,108,157, Oct. 22, 1963. In order to avoid unnecessary complication of the schematic showing in FIG. 1, only the input coils, A, B, C, D, E and F, of the conference amplifier ports are indicated; the entire conference amplifier is shown in FIG. 4 of the drawing and, as just set forth, the over-all arrangement and operation are fully disclosed in the Feiner Patent 3,108,157.

In accordance with the novel arrangement contemplated by the invention, the respective conference ports, that is, the external connections of conference amplifier ports A, B, C, D, E and F, are terminated on respective verticals of a selected crossbar switch or switches of the line, link and marker switch. For purposes of description alone, it will be assumed that verticals 117, 118, 119, 121, 122, and 123 of a particular switch are selected and that the first vertical, 117, is given a ring-down tie trunk (RTT) class of service and that verticals 118, 119, 121, 122, and 123 are given a central office trunk (COT) class of service by suitable strapping at the PBX terminal strips.

As will be apparent from the subsequent general description in connection with FIG. 1, as well as from the more detailed description in connection with other figures of the drawing, the novel arrangement contemplated is such that any one of the PBX stations, for example station 111 illustrated, may set up a conference loop either with any five of the other PBX stations, for example stations 112, 113, 114, 115 and 116 illustrated, or with any four such stations and a remote station reached over a central office trunk, for example trunk 124 illustrated. (It will be understood that the reference numbers "112," "113," etc., can for the present purpose also be considered the code calling numbers of the respective stations. Actually, in a PBX installation of the nature referred to, the stations will often be assigned code calling numbers of only two digits). However, the latter connection can be completed only by the attendant through the position circuits of console 125, and only when such connection is initiated by the PBX station with the status of "conference controller," since the verticals 118, 119, 121, 122 and 123 are normally on a "service denied" basis to all calls except those completed between the local PBX stations. The manner in which this restriction is temporarily removed with regard to vertical 123 will be described subsequently.

Let us assume now for purposes of further description that any one of the PBX subscribers, for example the subscriber served by station 111, desires to set up a conference loop with five other PBX stations. The number of the first assigned vertical in the illustrative embodiment, "117," that is, the vertical assigned to conference port "0," is the calling code for originating a conference. Accordingly, the subscriber at station 111 dials the number "117" and the normal action of the line, link and marker circuit as fully described in the Williams Patent 2,904,637 referred to above, terminates his station on calling port "0." (For purposes of simplification, only the two leads tip and ring are indicated in FIG. 1; it will be understood, of course, that the usual sleeve lead is included and performs its normal functions and this will be shown in the subsequent detailed figures).

Operation of the involved switch crosspoints closes the tip and ring of port 0 through the link to the calling station 111 and this results in operation of relay 2L of the conference control circuit. Operation of relay 2L is followed by operation and release of several different relays in the conference control circuit, which operations will be described in detail subsequently in connection with other figures of the drawing. For our present purposes, it is sufficient to mention only the operation of relay 7CR1, which results in placing a bridging circuit across the tip and ring of port 1 and the associated vertical 118. In accord with the normal operation of the line, link and marker circuit, the bridged tip and ring of vertical 118 signals the marker to connect the vertical to a dial pulse register as register 126 illustrated, and to return dial tone to the control or originating station 111.

After receiving dial tone the conference originator, i.e., the subscriber at PBX station 111, dials the code of the first conferee station which he wishes to include in the conference loop being set up; it will be assumed for purposes of description alone that this is station 112. As the code of station 112 is dialed from station 111, line relay 2L, operating in its normal manner, follows the dialing and pulses the dial pulse register 126. Through relay and marker operations which now follow, and which will be described subsequently in connection with other figures of the drawing, the conferee station 112 is rung and, when it answers, it is connected via tip and ring through vertical 118 to conference port 1. During the ringing period audible ringing tone is fed back to the conference originator. Again through steps which will be fully described subsequently, relay 7CR1 is released, removing the bridge circuit from port 1, and relays 7BC1 and 7CRDK are operated whereby to connect conference port 1 through to conference amplifier port B and conference port 0 through to conference amplifier port A. The conference originator station 111 and the first conferee station 112 are now connected by the conference amplifier (FIG. 4) and the two subscribers may converse. Presumably at this point the conference originator would advise the first conferee of the nature of the conference loop being set up and of its status at the moment.

Assuming now that the conference originator wishes to add a second conferee to the conference loop, and assuming further, for purposes of illustration alone, that the second station to be added is station 113, the conference originator prepares for this step by "flashing," that is momentarily depressing the switchhook of his station 111. Depressing the switchhook opens the tip and ring loop connected to vertical 117 and releases relay 2L; this is followed by operation of relay 7CR2. (These operations will be discussed in detail subsequently in connection with the detailed descriptive portion of the specification). When the switchhook is released, and with relay 7CR2 operated as just stated, a bridging circuit is placed across conference port 2 and vertical 119. As before at vertical 118, the bridging circuit across vertical 119 signals the marker to connect dial pulse register 126 thereto and dial tone is returned to the conference originator at station 111. The conference originator now dials the code of the second conferee station 113 which is rung, and which upon answering is connected via tip and ring through vertical 119 to conference port 2. Operations follow, which will be described in detail subsequently, resulting in release of relay 7CR2, whereby to remove the bridging circuit from port 2, and in operation of relays 7BC2 and 7CRDK, whereby to connect port 2 through to conference amplifier port C and to reconnect port 0 through to conference amplifier port A. The conference originator and the first two added conferees are now connected by the conference amplifier and may converse as desired.

By following a procedure similar to that discussed, which includes a switchhook "flash" followed by dialing the code of the respective next conferee station to be added, up to three more PBX stations, represented for purposes of description by stations 114, 115, and 116 may be added to the conference loop. It will be understood, of course, that the conference loop may be operated with fewer than the maximum number of stations connected, for example with only the station of the conference originator and the station of one conferee. However, once the capacity of the loop has been reached, that is when all conference ports are occupied, should the conference controller attempt to add still another station, a busy tone is returned to his station. The particular circuits involved will be described in detail subsequently, including the novel arrangement whereby this busy tone is heard by the conference controller alone and not by the other conferees. Also, by circuits and operations to be described in detail subsequently, the conference originator while setting up a conference loop may return to the conference bus by flashing his switchhook should a called conferee station present a "busy" or a "don't answer" condition.

During the progress of the conference, should a station leave the conference loop by going on-hook, that station is restored to normal condition and may initiate or receive calls in the usual manner. In the event the conference originator and one other conferee should leave the conference loop, any one of the remaining conferees may attain "conference controller" status by a switchhook flash. The novel circuit arrangements by which this is accomplished will be fully described subsequently with reference to the more detailed figures of the drawing. (In the event that the conference circuit is not full and there is already a vacant port, it is then not necessary, of course, that another conferee in addition to the conference controller leave the conference connection.)

As indicated above, it may often be found desirable that the conference connection include a remote station not included in the PBX and reached only over a central office trunk. While, as also previously indicated, it is desirable that any PBX subscriber be able to set up and control a conference loop independently of the attendant, it is at the same time imperative to avoid any attempt to usurp certain functions normally assigned to the attendant, particularly the function of calling a station remote from the PBX and adding such station to the PBX group; such function should remain with the attendant. However, in order that general control of the conference makeup may remain with the conference originator (or controller), the attendant should be enabled to gain access to the conference only through steps initiated by the conference controller. Accordingly, in accordance with the novel arrangement contemplated, the verticals 117, 118, 119, 121, 122, and 123 of the illustrative embodiment are maintained, through particular terminal strappings, on a normally "service denied" basis with respect to all connections except those established by a conference originator, or controller, with other PBX stations. However, through novel means controlled by the conference originator, one vertical, in the illustrative embodiment vertical 123, may be made available for connection thereto by the attendant of a central office trunk. As indicated schematically, an auxiliary path 127 affording access to this vertical is closed upon operation of relay 6D0 as subsequently described.

Assuming now that the conference originator wishes to have a remote station added to the conference loop, conference port 5 being vacant, he dials "0" for connection to the attendant. The marker and register operate in their normal manner to connect the conference originator through his calling port, vertical 117, to the attendant's console 125. Relay 6D0 ("dial zero") operates at this time and, among other functions, partially completes auxiliary path 127 to vertical 123 for subsequent connection of trunk 124, and opens the operating path of relay 7CR5 whereby to "reserve" conference port 5 for use by the attendant. (Normally, operation of relay 7CR5 places a bridge across port 5 and signals the marker to connect vertical 123 to a dial pulse register for reception of pulses dialed by the conference controller.) The conference circuit is now "primed" so that a connection to port 5 can subsequently be completed by the attendant.

When the attendant has been given the number of the desired remote subscriber, she calls the distant station over a central office trunk, for example trunk 124 illustrated, then operates the HOLD key at her console and receives PBX dial tone. She then dials "123" whereupon the marker operates in the normal manner for connecting a central office trunk to a tie trunk and connects trunk 124 to vertical 123. This connection is made possible by the closing of auxiliary path 127 by operation of relay 6D0 as mentioned above. Relay 7BC5 also operates at this time whereby to connect the remote station via trunk 124, auxiliary path 127, vertical 123 and port 5 to the conference amplifier whereby to include the remote station in the conference loop.

It is apparent from the above that the novel arrangement contemplated by the invention, and shown schematically in FIG. 1 in one specific illustrative embodiment, is such that a conference loop including selected PBX stations may be completed by any one PBX subscriber entirely independent of the attendant. In the event it be desired to include a station remote from the PBX, the function of calling such a remote station is left with the attendant as one of her duties which it would be undesirable to have appropriated by the subscribers. However, in order that the over-all control of the conference may be retained by the subscribers, the attendant is given access thereto only through operations initiated by the particular subscriber who at the moment has the status of conference originator or conference controller.

A more detailed description of the contemplated arrangement, with particular regard to the conference control circuit, will now be given, reference being made particularly to FIGS. 2 to 7. The circuits illustrated are arranged in the so-called "detached contact" type of representation wherein, generally speaking, relay contacts are shown separated from the relay winding which controls the respective contact. This type of disclosure permits functional groups of circuitry to be shown separately, thus facilitating an understanding of the operational features involved. Each designation of a relay winding or the like is preceded by a numeral indicating the figure of the 'awing in which the apparatus appears, for example, the inding of relay 2L appearing in FIG. 2 and the winding ' relay 7CR1 appearing in FIG. 7. Further, each contact :signation is followed by a numeral in parentheses which dicates the figure of the drawing in which the contact ›pears, for example the designation "2L–1(6)" indicates at contact No. 1 of relay 2L appears in FIG. 6 while the lay winding, as pointed out above, appears in FIG. 2. ι accord with usual circuit design, transfer contact pairs ay be either Early Make-Break (continuity) or Early reak-Make (sequence transfer) as dictated by the parcular circuit operational requirements.

*Originating a conference connection*

It will be assumed that the conference originator, by ialing "117" as described above in connection with FIG. , has been connected to vertical 117 which, as previously ointed out, has been assigned to conference port 0. )peration of the crossbar switch crosspoints closes tip 11 and ring 212 of port 0 through the link to the calling :ation and, since the station loop is closed, an obvious ath is completed for operating relay 2L. Relay 2L, operted, completes a path for operating relay 6SRC traced rom ground, make contact of transfer pair 2L–1(6), pper winding of relay 6SRC to battery; relay 6SRC upon perating completes at its make contact 6SRC–1(6) a hort-circuiting loop through its lower winding which nparts a slow-release characteristic to the relay.

Relay 6SRC, operated, completes obvious paths through ıake contacts 6SRC–2(6) and 6SRC–3(6) respectively, or operating relays 6ON and 6ONA; relay 6ON upon )perating locks to ground through its make contact ;ON–1(6) and break contact 6ONRL–1(6), and relay ;ONA locks to ground through make contact 6ON–2(6).

Relay 6ONA, operated, provides through make contact ;ONA–2(2) a holding ground over the sleeve lead of 'ertical 117 for the calling party HOLD magnet (not hown) and partially completes at its make contact ;ONA–1(7) a locking path for relays 7BC1 to 7BC5. Relay 6ON, operated, partially completes at its make conact 6ON–3(7) a locking path for relays 7CR1 to 7CR5.

Also, relay 6ON, upon operating, partially completes at :ts make contact 6ON–4(6) a holding path for relay 5RRL; partially completes at its make contact 6ON–5(6) ın operate path for relay 6D1 and an operate path for relay 6RS; closes a path for operating relay 7CRDK from ground, through its make contact 6ON–6(7) and break contacts of respective transfer contact pairs 7CR1–1(7), 7CR2–1(7), 7CR3–1(7), 7CR4–1(7), and 7CR5–1(7); break contact 7Z–1(7), winding of relay 7CRDK to battery; and partially completes at its make contact 6ON–7(6) a holding path for relay 6PM.

Relay 7CRDK, operated, closes an operate path for relay 7CR1 traced from ground, make contact 6ON–3(7), break contact of transfer pair 5RRL–1(7), break contact 6PM–1(7), make contact 7CRDK–1(7), break contact 7RV–1(7), thermistor 711, break contact of transfer pair 7CR1–2(7), break contact 2S1–1(7), winding of relay 7CR1 to battery; relay 7CR1 operates after a delay period determined by the characteristics of thermistor 711; for example, this may be a delay of approximately 400 milliseconds.

Relay 7CR1, operated, removes thermistor 711 from its operate path at the break contact of its transfer pair 7CR1–2(7) and locks to ground at make contact 6ON–3(7) through the make contact of the same transfer pair. Also, relay 7CR1 upon operating interrupts at the break contact of transfer pair 7CR1–1(7) the operate path of 7CRDK; relay 7CRDK releases and thus completes an operate path for relay 5RRL traced from ground, make contact 6ON–5–(6), the break contact of transfer pair 7CRDK–2(6), lead 611, make contact 6SRC–4(5), thermistor 511, winding of relay 5RRL to battery; relay 5RRL operates after a delay interval determined by the characteristics of thermistor 511 and, upon operating, closes at its make contact 5RRL–2(5) a shunt path around thermistor 511 whereby to remove it from the relay operate path.

In addition, relay 7CR1, operated, prepares at the make contact of transfer pair 7CR1–1(7) an operate path for relay 7BC1; connects a holding ground of the order of 100ω through resistor 213 and the make contact of transfer pair 7CR1–3(2) to sleeve lead 214 of vertical 118; and places a bridging circuit across the tip and ring of port 1 and vertical 118, this bridging or short-circuiting path being traced from tip 215, the break contact of transfer pair 5TP1–1(2), make contact 7CR1–4(2), the break contact of transfer pair 7D9W–1(2), the break contact of transfer pair 6RS–1(2), winding 216 of repeat coil 2T1, make contact 2L–2(2), polarized operating circuit of relay 2P, winding 217 of repeat coil 2T1, the break contact of transfer pair 6RS–2(2), the break contact of transfer pair 7D9W–2(2), make contact 7CR1–5(2), the break contact of transfer pair 5TP1–2(2) to ring 218.

It will be recalled from the preceding general description in connection with FIG. 1 that placement of this bridge circuit across the tip and ring of conference port 1 signals the marker, acting in its normal manner, to connect vertical 118 to a dial pulse register and to return dial tone to the conference originator.

The code of the first conferee station to be added is now dialed at the conference controller station, and line relay 2L "follows" the dial pulses. Since make contact 2L–2(2) of the line relay is a series element in the short-circuiting bridge across tip 215 and ring 218, which was described above, the dial pulse register connected to vertical 118 is pulsed by relay 2L. In accordance with the normal operation of the dial pulse register as set forth, for example, in the Williams Patent 2,904,637 referred to above, after receiving the proper number of digits it reverses the tip 215 and ring 218; this operates relay 2P, which is polarized by diodes 2A and 2B, and at the same time the dial pulse register calls the marker.

Relay 2P, operated, closes a path for operating relay 6MC traced from ground, break contacts 6D3–1(6) and 6PM–2(6), make contact 2P–1(6), the break contact of transfer pair 6MC–1(6), winding of relay 6MC to battery; relay 6MC, upon operating, locks through the make contact of its transfer pair 6MC–1(6) to ground on break contact 612 of a relay in the marker (not shown).

Relay 6MC, operated, closes at its make contact 6MC–2(6) a path for operating relay 6CCC of the marker; operation of this relay is effective to cancel the normal camp-on function of the marker since this particular function is not utilized in the present arrangement. Also relay 6MC, operated, closes at its make contact 6MC–3(6) an operate path for relay 6PM, and closes an operate path for relay 6RS traced from ground, break contact 613 of a marker relay (not shown), make contact 6MC–4(6), the break contact of transfer pair 6RS–3(6), winding of relay 6RS to battery; relay 6RS operates and locks through the make contact of its transfer pair 6RS–3(6), break contacts 5RT–1(6) and 6D1–(6), make contact 6ON–5(6) to ground.

Relay 6PM, operated, interrupts at break contact 6PM–1(7) one of the locking paths for relays 7CR1 to 7CR5, and prepares at its make contact 6PM–3(6) a path for operating relay 6D1 when relay 2L has released.

Relay 6RS, operated, releases relay 2P by opening the shunting bridge across port 1 at the break contacts of transfer pairs 6RS–1(2) and 6RS–2(2), interrupts at the break contact of transfer pair 6RS–4(2) the termination through windings 219 and 221 of repeat coil 2T1 across the tip 211 and ring 212 of vertical 117 and prepares paths for subsequent supply of ringing potential to vertical 118.

After the marker has completed its functions it releases itself and the dial pulse register from the connection in its normal manner; release of the marker interrupts the holding path of relay 6MC which releases.

At this point ringing of the first conferee station takes place since with relay 6RS operated and relay 6MC released, interrupted ringing voltage is supplied from source 513 over line 514, break contact 6MC–5(2), the make contact of transfer pair 6RS–2(2), the break contact of transfer pair 7D9W–2(2), make contact 7CR1–5(2) and the break contact of transfer pair 5TP1–2(2) to ring 218 of vertical 118, and ringing ground is supplied from source 515 over line 516, the make contact of transfer pair 6RS–1(2), the break contact of transfer pair 7D9W–1(2), make contact 7CR1–4(2), the break contact of transfer pair 5TP1–1(2) to tip 215 of vertical 118. The called station is rung, and audible ringing feedback is fed through capacitor 2H and the make contact of transfer pair 6RS–4(2) for transmission through the break contact of transfer pair 7CRDK–3(2) to ring 212 of vertical 117 and so to the conference originator station.

When the called conferee answers by going off-hook and closing the tip-ring station loop, relay 5RT operates over the ringing path traced above which includes the left relay winding as a series element; relay 5RT upon operating locks from battery, right relay winding, make contact 5RT–2(5), line 611 break contact of transfer pair 7CRDK–2(6), make contact 6ON–5(6) to ground. Relay 5RT, operated, closes at make contact 5RT–3(7) an obvious operate path for relay 7BC1, and releases relay 6RS by opening the locking path at break contact 5RT–1(6).

Relay 7BC1, operated, partially completes a locking path at make contact 7BC1–1(7), and operates relay 2S1 by closing battery through the lower winding and the make contact of transfer pair 7BC1–2(2) to ring 218 of vertical 118 and closing ground through the upper winding and make contact 7BC1–3(2) to tip 215 of vertical 118, the path being completed through the closed station loop; relay 2S1 remains operated under control of the first conferee station called. Also, relay 7BC1 operated, removes at the break contact of transfer pair 7BC1–4(2) the terminating bridge comprising capacitor 224 and resistor 225 from its shunt connection across lines 222 and 223 and connects tip 215 and ring 218 to these lines through make contact 7BC1–3(2) and the make contact of transfer pair 7BC1–4(2) respectively. The first conferee station is now connected to conference amplifier port B (FIG. 4), therefore, over lines or circuits 222 and 223. (For purposes of simplification the respective connections between conference ports and conference amplifier ports are indicated by dash-dot lines as being made through a common cable).

In addition, relay 7BC1, operated, provides at make contact 7BC1–5(2) a supplementary path for connecting holding ground through resistor 213 to sleeve lead 214 of vertical 118, and also completes a path for operating relay 7RV from ground, make contact 7BC1–6(7), the break contacts of transfer pairs 7BC2–1(7), 7BC3–1(7), 7BC4–1(7), and 7BC5–1(7), winding of relay 7RV to battery; relay 7RV upon operating completes a path for operating relay 5TPDK traced from ground, make contacts 5RRL–3(5) and 7RV–2(7), break contact 5TPDK–1(5), winding of relay 5TPDK to battery.

Relay 2S1, operated, releases relay 7CR1 by opening the operate path at break contact 2S1–1(7); partially completes at make contact 2S1–2(7) an operate path for relay 7CR2; completes at make contact 2S1–3(7) an obvious operate path for relay 7BCH1; relay 7BCH1 operates and closes at make contact 7BCH1–1(7) a locking path to ground at make contact 6ONA–1(7) for relay 7BC1.

Relay 7CR1, released, opens at the make contact of transfer pair 7CR1–3(2) one of the paths for connection of 100 ohm ground to sleeve lead 214; the sleeve ground connection is maintained over the path through make contact 7BC1–5(2). Also, with relay 7CR1 released, relay 7CRDK reoperates from ground, make contact 6ON–6(7), break contacts of transfer pairs 7CR1–1(7), 7CR2–1(7), 7CR3–1(7), 7CR4–1(7) and 7CR5–1(7), break contact 7Z–1(7), winding of relay 7CRDK to battery.

Relay 7CRDK, operated, interrupts at the break contact of transfer pair 7CRDK–2(6) the locking path of relay 5RT, which releases; interrupts at the break contact of transfer pair 7CRDK–4(6) the previous locking path to ground at make contact 6ON–7(6) for relay 6PM, which releases; and interrupts also at the break contact of transfer pair 7CRDK–4(6) a previous locking path for relay 5RRL, which releases. Also, relay 7CRDK, operated, disconnects at the break contact of transfer pair 7CRDK–5(2) the terminating bridge comprising capacitor 226 and resistor 227 previously connected in shunt across lines 228 and 229, and connects ring 212 and tip 211 over these lines through the respective make contacts of transfer pairs 7CRDK–3(2) and 7CRDK–5(2) to conference amplifier port A.

At this point, therefore, the conference originator connected to vertical 117 and the first called conferee connected to vertical 118 are connected through to respective conference amplifier ports A and B (FIG. 4) and may converse with each other. As pointed out above in the general description given in connection with FIG. 1, the conference originator would probably at this time inform the first called conferee regarding the makeup of the proposed conference.

As also pointed out above, the conference amplifier (FIG. 4) follows the general design set forth in A. Feiner Patent 3,108,157, Oct. 22, 1963 and will be described only in general terms here. The conference amplifier includes three two-coil hybrid circuits with associated single-stage grounded base transistor amplifiers 411, 412 and 413. Each outlet or port (as A, B, etc.) is provided with a capacitor as 414, 415, . . . 419, which serves to prevent direct-current line currents from flowing through the transformers.

The secondary of the low impedance transformer associated with ports A and B is connected to the emitters of the transistors of amplifier 411 through an R-C network comprising resistor 421 connected in parallel with capacitors 422 and 423. The purpose of capacitors 422 and 423 is to couple the alternating-current signal to the transistor emitters and at the same time prevent direct-current flow from emitter to emitter due to forward junction voltage differences. Resistor 421 is effective to damp any possible resonance resulting from use of the capacitors in conjunction with the transformer secondary and yet maintain a relatively high direct-current resistance from emitter to emitter. Capacitor 424 is provided to enhance stability while resistors 425 and 426 in conjunction with the bias network voltage set the quiescent current through the two transistors and so determine overload characteristics. Resistors 427 and 428 limit the current flow through the transistor collectors in the event of possible interference or excess voltage conditions. Coupling networks similar to that described above, are provided in conjunction with the other two amplifiers 412 and 413.

In general, operation of the conference amplifier is based upon the concept of unbalanced hybrid coils with intercoupled common-base transistor amplifiers. The grounded base transistor provides a nearly unity current amplification and has a very low input impedance and a very high output impedance. This difference serves to unbalance the hybrids sufficiently that transmission between the respective outlets or ports is practically without loss.

*Conference originator adds second conferee station*

As pointed out above in connection with FIG. 1, the conference originator prepares the circuit for addition of a second conferee station by a flash of his switchhook; this transfers the originating station from the conference bus to a dial pulse register as now described.

When the conference originator depresses his switchhook, the station loop connected to tip 211 and ring 212 f vertical 117 is opened and line relay 2L accordingly eleases. Relay 2L, released, closes a path for operating elay 6D1 from ground, make contact 6ON–5(6), the nake contact of transfer pair 7CRDK–2(6), break conacts 2L–3(6) and 6D8–2(6), winding of relay 6D1 to attery; relay 6D1, operated, closes an operate path for elay 7CR2 from ground, make contact 6ON–3(7), the reak contact of transfer pair 5RRL–1(7), break contact PM–1(7), the make contact of transfer pair 6D1–2(7), nake contact 2S1–2(7), the break contact of transfer pair CR2–2(7), winding of relay 7CR2 to battery. (If the witchhook remains down more than about 100 milliseconds, relay 6SRC may release, but this relay has no articular functions in the present sequence.)

Relay 7CR2, operated, opens at the break contact of ransfer pair 7CR2–1(7) the operate path of relay CRDK, which releases; partially completes at the make ontact of its transfer pair 7CR2–1(7) an operate path or the next "bus-connect" relay 7BC2; connects a holding ground of the order of 100ω through resistor 231 and nake contact of transfer pair 7CR2–3(2) to sleeve lead 232 of vertical 119; and partially completes at make contacts 7CR2–3(2) and 7CR2–4(2) a path for placing a short circuit across tip 233 and ring 234 of conference port 2 and vertical 119.

Relay 7CRDK, released, closes an operate path for relay 5RRL from ground, make contact 6ON–5(6), break contact of transfer pair 7CRDK–2(6), line 611, make contact 6SRC–4(5), thermistor 511, winding of relay 5RRL to battery; relay 5RRL operates after an interval determined by the characteristics of thermistor 511, and upon operating, closes at make contact 5RRL–2(5) a path shunting the thermistor. (In the event relay 6SRC has released upon a "long" depression of the switchhook as mentioned above, the operate path for relay 5RRL is prepared at this time and is completed after relay 2L operates and reoperates relay 6SRC.)

Also, relay 7CRDK, released, disconnects at the make contacts of respective transfer pairs 7CRDK–3(2) and 7CRDK–5(2), conference port 0 from conference amplifier port A and connects at the break contact of transfer pair 7CRDK–5(2) the resistor-capacitance terminating network across port 0; opens at the make contact of transfer pair 7CRDK–2(6) the operate path of relay 6D1, which releases; prepares at the break contact of transfer pair 7CRDK–4(6) a locking path for relay 6PM; and prepares at the break contact of transfer pair 7CRDK–2(6) a locking path for relay 5RT.

When the switchhook is released (after "flashing") at the originating station, the station loop is reclosed and relay 2L reoperates; at this time relay 6SRC operates, in the event it had released during a long flash as above mentioned, and relay 5RRL operates. Relay 2L, operated, closes a path for placing a short circuit across vertical 119; this path is traced from ring 234 of vertical 119 and conference port 2, the break contact of transfer pair 5TP2–2(2), make contact 7CR2–3(2), the break contact of transfer pair 7D9W–2(2), the break contact of transfer pair 6RS–2(2), winding 217 of repeat coil 2T1, winding of polarized relay 2P, make contact 2L–2(2), winding 216 of the repeat coil, the break contact of transfer pair 6RS–1(2), the break contact of transfer pair 7D9W–1(2), make contact 7CR2–4(2), the break contact of transfer pair 5TP2–3(2), to tip 233 of port 2 and vertical 119.

As described earlier in the detailed description and also in the general description with reference to FIG. 1, placing this bridging circuit across the tip and ring of the vertical signals the marker, operating in its normal manner, to attach a dial pulse register to vertical 119. Dial tone is now returned to the originating subscriber as described above and, when he has dialed the code of the second conferee station, this station is connected to vertical 119 and rung.

When the second called conferee station responds to the ringing by going off-hook and closing the station loop, relay 5RT operates over its left-hand winding and the ringing loop, locking on its right-hand winding to ground at make contact 6ON–5(6) as previously described. Relay 5RT, operated, closes an operate path for relay 7BC2 from ground, make contact 6ON–6(7), break contact of transfer pair 7CR1–1(7), make contact of transfer pair 7CR2–1(7), make contact 5RT–4(7), winding of relay 7BC2 to battery, and also releases relay 6RS by interrupting the locking path at break contact 5RT–1(6).

Relay 7BC2, operated, completes a path for operating relay 2S2 by closing ground through the upper winding and make contact 7BC2–3(2) to tip 233 and by closing battery through the lower winding and make contact 7BC2–4(2) to ring 234; since the tip and ring of vertical 119 are closed through the station loop of the second called conferee station, relay 2S2 operates and remains operated under control of the second called conferee station.

Also relay 7BC2, operated, removes at the break contact of transfer pair 7BC2–5(2) the terminating network comprising capacitor 235 and resistor 236 from its shunt connection across lines or circuits 237 and 238 and connects, at the make contact of the same transfer pair and make contact 7BC2–3(2), ring 234 and tip 233 through lines 237 and 238 to port C of the conference amplifier, FIG. 4. The second called conferee station is now connected through vertical 119 and conference port 2 to conference amplifier port C.

In addition, relay 7BC2, operated, provides at make contact 7BC2–6(2) a supplementary path connecting holding ground to sleeve lead 232 of vertical 119, partially completes at make contact 7BC2–2(7) a holding path for itself, and closes at make contact 7BC2–1(7) an operate path for relay 7RV; relay 7RV operates and closes at make contact 7RV–2(5) an operate path for relay 5TPDK.

Relay 2S2, operated, releases relay 7CR2 by opening the holding path at break contact 2S2–1(7), partially completes at make contact 2S2–2(7) an operate path for relay 7CR3, and closes at make contact 2S2–3(7) an operate path for relay 7BCH2; relay 7BCH2 operates and completes at make contact 7BCH2–2(7) the locking path to ground on make contact 6ONA–1(7) for relay 7BC2.

Relay 7CR2, released, opens at the make contact of transfer pair 7CR2–3(2) one path for supply of holding ground to sleeve 232; the path through make contact 7BC2–6(2) remains effective however. Also relay 7CR2, released, closes the operate path of relay 7CRDK at the break contact of transfer pair 7CR2–1(7) and relay 7CRDK operates.

Relay 7CRDK, operated, releases relays 5RT, 6PM and 5RRL as previously described above; also relay 7CRDK upon operating disconnects at the break contact of transfer pair 7CRDK–5(2) the previously-described terminating network from its shunt connection across lines 228 and 229 and reconnects at the make contact of the same transfer pair and make contact 7CRDK–3(2), tip 211 and ring 212 over lines 228 and 229 to conference amplifier port A. The conference originator and the first and second called conferees are now connected through the conference amplifier and may converse with each other.

Additional conferee stations are called and added to the conference loop in the same general manner described above until the capacity of the loop is reached; in each instance a switchhook flash by the originating subscriber is followed by dialing the number of the next conferee station to be added. In each instance, however, the "next" relay in the "bus connect," "bus connect hold," "connect register," and "supervisory-station line" groups is involved; for example, in adding the third conferee station, relays 7CR3, 7BC3, 7BCH3 and 3S3 are involved.

In this connection it will be of interest to review at this point the functions of certain of the novel relay circuit arrangements provided. For example it will now be clear from the above description that an important feature of the conference circuit results in progressive connection of the respective verticals to a dial pulse register preparatory to dialing the next conferee station to be added; this progressive action is attained through the "connect register" chain, that is the 7CR- relays. The particular relay in this chain which is operated at a particular point in the connection depends, in turn, on the supervisory relay operated. For example, it will be recalled from the previous description that, when supervisory relay 2S2 operated following answer by the second called conferee station, a path was prepared at make contact 2S2–2(7) for subsequent operation of register connect relay 7CR3. Accordingly, when we reach the stage where the third conferee station is to be dialed, we have the previously-described shorting path (through windings 216 and 217 of repeat coil 2T1 and winding of relay P) applied through make contact 7CR3–3(3) and the break contact of transfer pair 5TP3–1(3) to tip 311 of vertical 121, and through make contact 7CR3–4(3) and the break contact of transfer pair 5TP3–2(3) to ring 312 of the vertical; as previously pointed out this condition will signal the marker to connect vertical 121 to the dial pulse register. Also a path is closed through the make contact of transfer pair 7CR3–5(3) for connecting holding ground through resistor 313 to sleeve 314 of the vertical.

In the situation just described, had register connect relay 7CR4 been operated, then the short circuiting path would have been applied through make contact 7CR4–2(3) and the break contact of transfer pair 5TP4–1(3) to tip 315 of vertical 122, and through make contact 7CR4–3(3) and the break contact of transfer pair 5TP4–2(3) to ring 316 of the vertical. In this case, therefore, the connection of the dial pulse register would be to vertical 122.

Another important feature of the novel arrangement which will be apparent from the preceding description is the progressive connection of each called conferee station through to the respective conference amplifier port upon their response to the ringing; this is attained by the 7BC–"bus connect" chain of relays. The particular relay in the chain operated at a given time is determined by the particular register connect relay operated at the same time. For example, in the example described just above with relay 7CR3 operated, bus connect relay 7BC3 will likewise operate, following operation of relay 5RT, through the make contact of transfer pair 7CR3–1(7) and make contact 5RT–6(7).

In the other situation referred to above, that is with relay 7CR4 operated, bus connect relay 7BC4 would then have operated whereby to connect the fourth called conferee station connected to vertical 122 through ring 316, the make contact of transfer pair 7BC4–2(3) and line 319, and through tip 315, make contact 7BC4–4(3) and line 321 to port E of the conference amplifier.

It will be recalled from the above description that a flash of the switchhook by the conference originator is effective in conditioning the circuit for calling the subsequent conferee station; the novel circuit arrangement of the 7CRDK relay is an effective element in this series of operations. Relay 7CRDK by its operated or released condition controls either the connection of a resistor-capacitance terminating network across port 0 or the connection of the originating station through the port to port A of the conference amplifier. After the connection of each additional conferee station to the conference amplifier, relay 7CRDK operates to reconnect the conference originator through to port A of the conference amplifier whereby to permit conversation with the conferees already added to the conference loop.

*All-ports-busy signal*

Returning now to overall operation of the circuit and recalling that conferee stations have been added to the full capacity of the loop, it will be assumed for purposes of further description that the conference originator attempts to add still another station, that is to exceed the capacity of the loop. This results in transmission of a busy tone to the originating station as will now be described.

With all conference ports occupied, all bus connect relays 7BC1 to 7BC5 are operated and relay 7DOM is released. With this condition, when relay 6D1 operates following the depression of the switchhook at the originating station, a path is closed for operating relay 7D9W traced from ground, make contacts 7BC1–7(7), 7BC2–7(7), 7BC3–4(7), and 7BC4–5(7), the make contact of transfer pair 7BC5–2(7), the break contact of transfer pair 7DOM–1(7), make contact 6D1–3(7), the break contact of transfer pair 7D9W–3(7), winding of relay 7D9W, resistor 712 to battery; relay 7D9W operates and locks to ground through the make contact of its transfer pair 7D9W–3(7) and make contact 6ON–8(7). Busy tone from source 517 is now connected to the conference originating line through capacitor 239, the make contact of transfer pair 7D9W–2(2), right-hand windings of repeat coil 2T1 to ground at make contact 7D9W–1(2); the tone is supplied through the repeat coil to the tip 211 and ring 212 and thence to the conference originator.

When the switchhook is released at the end of the flash and relay 2L reoperates, the operate path of relay 6D1 is opened at break contact 2L–3(6) and relay 6D1 releases; relay 6D1, released, opens at make contact 6D1–3(7) the previous shunting path to battery around relay 7Z by way of lead 713, the break contact of transfer pair 7Z–2(7) and resistor 714, and relay 7Z now operates from battery, resistor 714, winding of relay 7Z, the make contact of transfer pair 7D9W–3(7), make contact 6ON–8(7) to ground. Relay 7Z, operated, opens at break contact 7Z–1(7) the operate path of relay 7CRDK, which releases. Relay 7CRDK, released, opens at the make contacts of respective transfer pairs 7CRDK–3(2) and 7CRDK–5(2) the connection of the originating station through to the conference amplifier whereby to prevent transmission of the busy tone to the other added conferees. The busy tone therefore is heard only by the conference originator and not by the other conferees to whom it would be of no significance.

After receiving the "all-ports-busy" indication, the conference originator may return to the conference loop by a second flash of his switchhook. When relay 6D1 operates following the switchhook flash, relay 7D9W releases due to the shunt path closed for its operating battery through the make contact of transfer pair 7Z–2(7), lead 713 and make contact 6D1–3(7); release of relay 7D9W is followed by release of relay 7Z since the operate path therefore is opened at the make contact of transfer pair 7D9W–3(7). With relay 7D9W released, the busy tone path is interrupted at the make contacts of transfer pairs 7D9W–2(2) and 7D9W–1(2), and with relay 7Z released, relay 7CRDK is reoperated through break contact 7Z–1(7) whereby to reconnect the originating station through conference port 0 to conference amplifier port A.

*Originator encounters "line busy" or "don't answer"*

In the above discussion of conference loop completion it has been assumed that each conferee dialed responded to the ringing, that is that no line busy or don't answer situations were encountered. However, in accordance with the novel arrangement contemplated, should either of these conditions be encountered, the conference originator may return to the conference bus simply by a flash of his switchhook. For purposes of description let us assume that a conferee station being called is either usy or does not answer and that the conference origina- ›r thereupon depresses his switchhook. It will further e assumed that the conferee station is being called over ort 4 and vertical 122.

When the switchhook is depressed, the station loop at ıe originating station is opened and relay 2L releases. {elay 2L, released immediately opens at make contact L-2(2) the short-circuiting path placed across vertical 22, this action being supplementary to that resulting from ubsequent release of relay 7CR4. Also, relay 2L, re- ›ased, closes at break contact 2L-3(6) the operate path f relay 6D1, which operates; closes at the break contact ıf transfer pair 2L-1(6) a locking path to ground for elay 5RRL; and opens at the make contact of the same ransfer pair the operate path of slow-release relay 6SRC vhich starts to release.

Relay 6D1, operated, releases relay 6RS by opening he locking path at break contact 6D1-1(6), and releases elay 7CR4 by opening at the break contact of transfer ›air 6D1-2(7) the previous locking path to ground at nake contact 6ON-3(7). Relay 7CR4, released, closes at he break contact of transfer pair 7CR4-1(7) the operate ›ath of relay 7CRDK; opens at make contacts 7CR4-3(3) ınd 7CR4-2(3) the tip and ring of port 4 so that subse- ıuent operation of relay 2L will not result in placing a ;hort circuit across port 4; and interrupts at the make :ontact of transfer pair 7CR4-5(3) the connection of ıolding ground through resistor 322 to sleeve 323.

Relay 7CRDK, operated, reconnects the conference ›riginator through the make contacts of respective trans- fer pairs 7CRDK-3(2) and 7CRDK-5(2) to conference ımplifier port A. When the conference originator releases ıis switchhook at termination of the flash, relay 2L re- ›perates. Relay 2L, operated, recloses at the make con- tact of transfer pair 2L-1(6) the operate path of slow- release relay 6SRC (if it released during the flash); re- leases relay 6D1 at break contact 2L-3(6); and releases relay 5RRL at the break contact of transfer pair 2L-1(6). Relay 6D1, released, opens at make contact 6D1-4(6) the holding path of relay 6PM, which releases.

At this point, therefore, the originating station is reconnected to the conference loop, and port 4 is cleared and available for use in adding the next conferee to be called.

The originator having received dial tone but not having completed dialing, may cancel the call and return to the conference loop by flashing his switchhook as above, but in this case the switch should remain closed for a sufficient period to allow full release of relay 6SCR. The ensuing circuit operations are essentially the same as described above in connection with a "busy" or "don't answer" condition.

*Central office trunk added to conference loop*

As pointed out above the novel arrangement contemplated is such that the conference originator may initiate action which enables the attendant to add a central office trunk connection to the conference loop through port 5. This connection cannot be made, however, either by the conference originator or by the attendant, each acting independently of the other. Dialing 0 by the originator results in reserving port 5 for subsequent connection of a central office trunk by the attendant.

When the conference originator dial 0 the dial pulse register and marker, in accordance with their normal operations, function to connect port 5 to an attendant's trunk. Relay 2P operates, as previously described, which is followed by operation of relay 6MC as the operate path is closed at make contact 2P-1(6). Following closure of relay contact 614 through normal marker operation at this point, relay 6D0 operates through make contact 6MC-6(6) and the break contact of transfer pair 6DO-1(6), and upon operating, locks to ground through the make contact of the same transfer pair, break contact 6DOR-1(6) and make contact 6ON-9(6). Also, following operation of relay 6MC, relay 6PM operates to ground through make contact 6MC-3(6).

Relay 6D0, operated, partially closes at make contact 6DO-2(6) a path between terminals 615 and 616; closure of the path, which follows release of relay 6MC by normal marker action and provided relay contacts 617 and/or 618 are closed also through marker action, is effective to remove the "service denied" restriction from vertical 123 only. As explained above, all verticals involved in the conference arrangement are normally on a "service denied" basis to all calls except those initiated by the conference originator and this restriction can be removed only from vertical 123 and only, as just described, by dialing 0.

Also, relay 6D0, operated closes at make contact 6DO-3(7) an obvious path for operating relay 7DOM; partially completes at make contact 6DO-4(7) an operate path for relay 7BC5; partially completes at make contact 6DO-4(7) an operate path for relay 7BC5; partially completes at make contact 6DO-5(3) a locking path for relay 3S5; and interrupts at break contact 6DO-6(7) the operate path of relay 7CR5 whereby to reserve port 5 for subsequent connection of the trunk.

Relay 7DOM, operated, prepares at make contact 7DOM-2(6) an operate path for relay 6DOR, and prepares at the make contact of transfer pair 7DOM-1(7) an operate path for relay 7D9W. Relay 2P releases at this point due to relay operation in the register.

Relay 2P reoperates when the attendant responds to the dialing by the conference originator; the attendant, after receiving the number of the desired remote subscriber, proceeds to call that subscriber over a central office trunk as described above in reference to FIG. 1. When the called subscriber answers, the attendant operates her HOLD key and receives PBX dial tone in the normal manner. She then dials the code of the vertical associated with port 5 (123), and the marker acting in the normal manner for connecting a CO trunk to a tie trunk, connects the central office trunk to vertical 123. As pointed out above the circuit is "primed" for this connection by the closure of the path through make contact 6DO-2(6).

When relay contact 619 of the marker is closed through normal operation of the line, link and marker circuit of the PBX, relay 7BC5 operates from ground over lead 621, make contact 6DO-4(7), winding of relay 7BC5 to battery. Relay 7BC5, operated, closes a path for operating relay 3S5 from battery, lower winding of relay 3S5, the make contact of transfer pair 7BC5-4(3), the break contact of transfer pair 5FO-1(3), the break contact of transfer pair 5TP5-1(3), ring 324, the closed station loop of the station now connected to vertical 123 and port 5, tip 325, the break contact of transfer pair 5TP5-2(3), the break contact of transfer pair 5FO-2(3), make contact 7BC5-5(3), upper winding of relay 3S5 to ground; relay 3S5 operates and locks to ground through make contact 3S5-1(3), break contact 6DOR-2(3) and make contact 6DO-5(3).

Also relay 7BC5, operated, connects port 5 through make contacts 7BC5-5(3) and the make contact of transfer pair 7BC5-6(3) and over lines 326 and 327 to conference amplifier port F, at the same time disconnecting the resistor-capacitance terminating network from its shunt connection across the lines, and also connects holding ground through resistor 328 and make contact 7BC5-7(3) to sleeve lead 329 of vertical 123.

Relay 3S5, operated and locked as above described, closes an obvious operate path for relay 7BCH5, which, upon operating, closes at make contact 7BCH5-2(6) an operate path through thermistor 622 for relay 6DOR; relay 6DOR operates after an interval determined by the characteristics of thermistor 622 and locks through the make contact of transfer pair 6DOR-3(6) to ground at make contact 6ON-10(6). Also, relay 7BCH5 operated supplies off-normal holding ground for relay 7DOM through make contacts 6ONA–1(7), 7BCH5–1(7) and 7DOM–3(7).

Relay 6DOR, operated, interrupts at break contact 6DOR–1(6) the locking path of relay 6D0; relay 6D0 releases, interrupts at make contact 6DO–2(6) the "priming" path between terminals 615 and 616, and interrupts at make contact 6DO–5(3) the temporary holding path for relay 3S5.

After the trunk connection has been completed to the conference amplifier port, the attendant should release her HOLD condition upon which she is released from the conference connection and cannot return thereto upon her own initiation. The attendant can be recalled by the conference originator, however, as will be described subsequently.

After port 5 has been primed or reserved for subsequent connection of a CO trunk as described above, a switchhook flash at the conference originating station will result in a return of busy tone as a reminder of the condition of the loop. When the switchhook is depressed at the start of the flash, relay 2L releases; this is followed by operation of relay 6D1 and release of relay 2P as described above.

Relay 6D1, operated, interrupts at the break contact of transfer pair 6D1–2(7) the holding path for relay 7CR5 to ground at make contact 6ON–3(7); relay 7CR5 releases and closes at the break contact of transfer pair 7CR5–1(7) the operate path of relay 7CRDK. Also, relay 6D1, operated, completes at make contact 6D1–3(7) an operate path for relay 7D9W. Relay 7D9W operates and completes at the make contact of transfer pair 7D9W–2(2) and make contact 7D9W–1(2) a previously-described path for supplying busy tone from source 517 through repeat coil 2T1 to the originating station.

When the switchhook is released at the end of the flash, relay 2L reoperates and relay 6D1 releases. This removes the previously-described shunt path of relay 7Z which now operates from battery, resistor 714, winding of relay 7Z, the make contact of transfer pair 7D9W–3(7), make contact 6ON–8(7) to ground. Relay 7Z, upon operating, opens at break contact 7Z-1(7) the operate path of relay 7CRDK; relay 7CRDK releases and prevents transmission of the busy tone through lines 228 and 229 to the conference amplifier where it would be heard by the other conferees.

In order to dispose of the busy tone the conference controller again flashes his switchhook. When the switchhook is depressed relay 2L releases and closes a path shunting to ground the operating battery for relay 7D9W from make contact 6ON–11(7), break contact 2L–4(7), make contact 7Z–3(7), the make contact of transfer pair 7Z–2(7), resistor 712 to battery; release of relay 2L also operates relay 6D1 which sets up at make contact 6D1–3(7) and through lead 713 a second shunting path for relay 7D9W.

When the switchhook is released at the end of the flash, relay 2L reoperates and releases relay 6D1; this opens at make contact 6D1–3(7) the operate path of relay 7Z which releases, the previous holding path having been opened by release of relay 7D9W. Release of relay 7Z recloses at break contact 7Z–1(7) the operate path of relay 7CRDK which operates and reconnects the conference originator over lines 228 and 229 to the conference amplifier.

*Attendant recall after CO trunk has been added*

When all conference ports are occupied, including the connection of a central office trunk to port 5 as described above, a switchhook flash at the conference control station results in a "flashing recall" signal on the CO trunk at the attendant's position. When the switchhook at the control station is depressed, relay 2L releases and starts the release of slow-release relay 6SRC. When relay 6SRC has fully released, slow-release relay 5FOM operates from battery, winding of relay 5FOM, break contact of transfer pair 6SRC–5(5), make contacts 7BCH5–3(5) 7BCH4–1(5), 7BCH3–1(5), 7BCH2–4(5), and 7BCH1–2(5), the make contact of transfer pair 6ONA–3(5) and make contact 7RV–3(5) to ground; relay 5FOM locks to this ground through make contact 5FOM–1(5) and break contact 5FO–3(5).

Release of relay 6SRC closes a path at the break contact of transfer pair 6SRC–6(6) for applying ground to time delay circuit 623 whereby to initiate timing action of that circuit. Time delay circuit 623 may be any one of the many interval measuring circuits well known in the art for example, it may include a capacitor and a gas-filled tube so arranged that when the capacitor has been charged to a certain potential the gas-filled tube will break down and close an appropriate circuit. The characteristics of the circuit are so established as to give the desired delay interval before the circuit is closed; in the present instance it will be assumed for purposes of description that the delay interval is of the order of 1.5 seconds. Accordingly, if the switchhook remains depressed for longer than 1.5 seconds, time delay circuit 623 will operate to apply ground to line 624 and relay 6ONRL will operate. If, on the other hand, the switchhook is released before the end of the 1.5 second timing interval, disconnect timing action by time delay circuit 623 is stopped and relay 6SRC is reoperated.

Relay 6SRC, operated, closes an operate path for relay 5FO from the ground at make contact 7RV–3(5) and a portion of the operate path of relay 5FOM, the make contact of transfer pair 6SRC–5(5), make contact 5FOM–2(5), winding of relay 5FO to battery; when relay 5FO operates a shunt path on the lower winding is closed at make contact 5FO–4(5) whereby to impart a slow-release characteristic to the relay.

Relay 5FO, when fully operated, opens at break contact 5FO–3(5) the locking path of relay 5FOM and starts the slow release of that relay. Also, battery and ground on tip 325 and ring 324 is reversed at transfer pairs 5FO–1(3) and 5FO–2(3); this is effective to lock in a flashing recall signal (not shown) which is associated with the central office trunk at the attendant's position. The flashing recall signal is an indication to the attendant that the central office trunk should be released.

Release, or disconnection, of the central office trunk by the attendant releases relays 3S5, 7BCH5, 7BC5, 7DOM, and 6DOR, this clears conference port 5 which may then be used for adding a conferee station or for another central office trunk connection. If another central office trunk connection is, in fact, desired, the conference originator (or controller) would dial 0 as described above for initiating the action of the attendant.

In the recall situation discussed above, had one or more of the ports 1–4 been vacant, and with the central office trunk still connected to port 5, the switchhook flash at the controlling station would result in dial tone instead of attendant recall to the CO trunk as just described. Under this condition the conference originator would dial 0 to reach the attendant and then give her instructions to release the CO trunk after which the conference originator would return to the conference by another switchhook flash.

*"Dial 9" trunk access denied*

As discussed above, the novel arrangement contemplated by the invention is such that a central office trunk can be added to the conference only through attendant action even though such action must be initiated by the conference originator. Let it be assumed now for purposes of description that the conference originator attempts to obtain access to a central office trunk by dialing "9" in the manner normal for nonconference purposes, that is to obtain access to the trunk directly without the services of the attendant. When the conference originator dials "9," the register and marker function in the normal manner for connecting a "dial 9" call. Relay 2P operates and .uses operation of relay 6MC; relay 6MC, operated, in rn operates relay 6PM. When relay contact 624 is osed through normal marker operation relays 7D9W ıd 7Z are operated from ground over lead 625, make ›ntact 6MC–8(7), and parallel paths to battery through e winding of relay 7D9W and resistor 712 and through e winding of relay 7Z and resistor 714, respectively.

Relay 7D9W upon operated locks to ground over two dependent paths, one through the make contact of transr pair 7D9W–3(7) and make contact 6ON–8(7), and e other through make contacts 7D9W–4(7) and 6PM–(7). Also, relay 7D9W, operated, removes at the break ›ntact of transfer pair 7D9W–2(2) the short circuit :ross the open ports or ports and connects busy tone om source 517 through capacitor 239, and the make ›ntacts of transfer pairs 7D9W–2(2) and 7D9W–1(2) one side of repeat coil 2T1 for transmission to the tip ıd ring of the station controlling the conference.

Relay 7Z, operated, prepares at the make contact of ansfer pair 7Z–2(7) a path for shuntdown release of :lay 7D9W when relay 2L is subsequently released.

The conference controller upon receiving the busy tone ; above described disposes of the signal and returns to ıe conference bus by an additional switchhook flash. /hen the switchhook is depressed at the start of the flash, :lay 2L releases; relay 2L, released, closes at break conıct 2L–3(6) an operate path for relay 6D1, which op:ates. Relay 6D1, operated, opens at the break contact f transfer pair 6D1–2(7) the holding path for the 7CR:lay chain and the relay in the chain last to operate now :leases. The particular 7CR-relay released removes holdıg ground from the sleeve of the associated port.

Release of relay 2L completes at break contact 2L–4(7) ıe shuntdown path to ground at make contact 6ON–1(7) for relay 7D9W and that relay releases and reıoves the busy tone from the conference controller line. Vhen the switchhook is released at the end of the flash, elay 2L reoperates, following which relays 6D1 and RRL release. Both holding paths for relay 7Z are now pen, one at break contact 2L–4(7) and the other at ıake contact 6D1–3(7), and relay 7Z releases. Release f relay 7Z closes at break contact 7Z–1(7) an operate ath for relay 7CRDK which now operates and reconects tip and ring of the central port to the conference mplifier. The conference connection is now restored to he condition which existed prior to the attempt by the onference controller to add a central office trunk by lialing "9," the normal trunk access code.

*Transfer of control*

As discussed above an important feature of the conemplated arrangement is the ability to transfer, under ertain conditions, conference control from one station o another. For descriptive purposes in this connection it vill be assumed first that the conference originator, conıected to port 0 as above described, now leaves the conerence by going on-hook or by depressing his switchıook for an interval in excess of a particular extent ıerein assumed to be of the order of 1.5 seconds. He :annot now re-enter the conference connection unless ecalled by a conferee station who has assumed control ›f the conference in a manner which will be described ubsequently. (The originating station if recalled would ›e connected at a port in the group 1–5 and not to port 0 ince the master conference number must remain "busy" o the marker.)

After the conference originator has released from the :onference, and assuming that a conference port (other han 0) is also "vacant" and available, let us assume that he conferee station connected to port 3 wishes to replace he conference originator and attain the status of con:erence controller; to do this he flashes his switchhook. (It will be assumed by way of example that the addiional available port is port 1.)

When the conferee station connected to port 3 depresses his switchhook, relay 3S3 releases since the operate path is interrupted at the opened station loop. Relays 7BC3 and 7BCH3 are slow-release and hold operated over a switchhook flash so that holding ground is maintained on sleeve 314 through resistor 313 and make contact 7BC3–6(3).

Relay 3S3, released, closes an operate path for relay 5TP3 traced from ground, make contacts 7RV–3(5), 5BY–1(5) and 5TPDK–3(5), break contact 5TEA–1(5) and break contacts of released relays of 7BCH-group, break contact 3S3–2(5), make contact 7BC3–7(5), winding of relay 5TP3 to battery; relay 5TP3 upon operating locks to ground through make contact 7BC3–7(5), the make contact of transfer pair 5TP3–3(5), the break contacts of transfer pairs 5TP2–4(5) and 5TP1–3(5) and make contact 5BY–2(5). Relay 5TP3, operated, interrupts at the break contact of transfer pair 5TP3–3(5) the operate path of relay 5TPDK, which releases, and also prepares at make contact 5TP3–4(5) paths for subsequent operation of relays 5TE and 5TEA.

Due particularly to their operation under control of a closed station loop, the 2S- and 3S- relays may be referred to herein as "supervisory line relays" or, in comparison to line relay 2L, as "other line relays."

When the station connected to port 3, the conferee station seeking status of conference controller, releases his switchhook at the end of the flash, relay 3S3 reoperates over the closed station loop; relay 3S3, operated, closes operate paths for relays 5TE and 5TEA from ground, make contact 7RV–3(5), the break contact of transfer pair 6ONA–3(5), break contacts 7BC1–8(5) and 7BC2–8(5), make contact 3S3–3(5), break contacts 7BC4–7(5) and 7BC5–8(5), make contact 5TP3–4(5), and through the respective operate windings of relays 5TE and 5TEA to battery. Relays 5TE and 5TEA upon operating lock to the ground at make contact 7RV–3(5) through make contact 5TEA–2(5) and break contact 5TPDK–4(5) and over a portion of the path just traced.

Relay 5TEA, operated, opens at break contact 5TEA–1(5) the operate path for relays 5TP1–5TP5 and also supplies holding ground for relay 3S3 from make contact 5TEA–3(2), line 243, make contact 5TP3–5(3), the make contact of transfer pair 7BC3–5(3), lower winding of relay 3S3 to battery. Relay 5TE, operated, also prepares at make contact 5TE–1(5) a locking path for relay 5TPDK and prepares at make contact 5TE–2(6) an operate path for relay 6D1. Also relay 5TE operated, closes an operate path for relay 2L from battery, left winding of relay 2L, line 241, the make contacts of transfer pairs 5TE–3(3) and 5TP3–2(3), the closed loop at the conferee station connected to port 3, the make contacts of transfer pairs 5TP3–1(3) and 5TE–4(3), line 242, right winding of relay 2L to ground; relay 2L operates and closes the operate path for relay 6SRC at the make contact of transfer pair 2L–1(6) and at the same time opens at break contact 2L–3(6) one of the operate paths of relay 6D1.

Relay 6SRC, operated, closes operate paths for relays 6ON and 6ONA which operate and lock over previously traced paths. Relay 6ON, operated, provides at make contact 6ON–12(5) holding ground for relays 5TE and 5TEA and reestablishes previously described holding paths for relays 7Z, 7D9W, 7CR1–5, 5RRL, 6RS and 6D0. Also, relay 6ON, operated, partially prepares operating paths for relays 6D1, 6DOR, 7BC1–5 and 7CR1–5 and closes at make contact 6ON–6(7) an operate path for relay 7CRDK; relay 7CRDK upon operating closes at the make contact of transfer pair 7CRDK–4(6) an operate path for relay 6D1 and removes at the break contact of transfer pair 7CRDK–2(6) off-normal ground from the operate path of relay 5RRL.

Relay 6ONA, operated, opens at the break contact of transfer pair 6ONA–3(5) the operate path of relays 5TE and 5TEA, provides through the make contact of transfer pair 6ONA–5(5) a holding path for relays 5TP1–5, releases relay 5BY by opening the locking path at the break contact of transfer pair 6ONA–5(5), and closes a path through make contact 6ONA–2(2) for supply of make-busy ground to the sleeve lead of vertical 117, the master conference vertical.

Relay 6D1, operated, will now operate the 7CR- relay for the lowest number port available which as pointed out above we are assuming to be port 1. Accordingly, relay 7CR1 now operates from ground, make contact 6ON–3(7), the break contact of transfer pair 5RRL–1(7), break contact 6PM–1(7), make contacts 7CRDK–1(7) and 6D1–5(7), the break contact of transfer pair 7CR1–2(7), break contact 2S1–1(7), winding of relay 7CR1 to battery. Relay 7CR1, operated, opens at the break contact of transfer pair 7CR1–1(7) the operate path of relay 7CRDK which releases, prepares at the make contact of the same transfer pair an operate path for relay 7BC1, and places through make contacts 7CR1–4(2) and 7CR1–5(2) a short circuiting path through one side of repeat coil 2T1 and the operate circuit of relay 2P across tip 215 and ring 218 of vertical 118 of port 1. As described above this short circuit across the tip and ring signals the marker to connect a dial pulse register to vertical 118.

Relay 7CRDK released, closes an operate path for relay 5RRL from ground, make contact 6ON–5(6), the break contact of transfer pair 7CRDK–2(6), line 611, make contact 6SRC–4(5), thermistor 511, winding of relay 5RRL to battery; relay 5RRL operates after an interval determined by the characteristics of thermistor 511. Also, relay 7CRDK, released, opens at the make contact of transfer pair 7CRDK–2(6), the operate path of relay 6D1, which releases, provides through the break contact of transfer pair 7CRDK–4(6) holding ground for relay 6PM and provides through the break contact of transfer pair 7CRDK–2(6) holding ground for relay 5RT.

Relay 5RRL, operated, closes an operate path for relay 5TPDK from ground, make contacts 5RRL–3(5) and 7RV–2(5), break contact 5TPDK–1(5), winding of relay 5TPDK to battery; relay 5TPDK operates and locks to ground through make contacts 5TPDK–2(5) and 5TE–1(5). Also, relay 5RRL, operated, transfers the holding path for the 7CR- relay chain from ground at make contact 6ON–3(7) to ground at make contact 6SRC–7(7).

At this point in the control sequence the following conditions prevail:

The conferee station connected to port 3, which is seeking to attain conference controller status, is transferred from its normal line relay 3S3 to the controlling line relay 2L being connected thereto over lines 241 and 242; the connection between the conferee station and conference amplifier port D over lines 317 and 318 is open at the respective break contacts of transfer pairs 5TE–4(3), 5TP3–1(3), 5TE–3(3) and 5TP3–2(3); relay 3S3 is held operated by the holding ground supplied over line 243; a dial pulse register is connected to the "vacant" port 1 and is returning dial tone to port 3 via repeat coil 2T1 and the bridging connection to tip 211 and ring 212 of vertical 117 over lines 241 and 242; and switch linkage to vertical 117 has been dropped by the previous disconnect of the conference originator although the conference control circuit number is held "busy" by ground connected to the sleeve through make contact 6ON–2(2).

Under the above conditions the conferee station connected to port 3 now has the status of "conference controller" and may control the conference connection in the same manner as described above with reference to the conference originator. In the assumed situation, for example, he might proceed to dial the code of the station he wished to add to the available port 1 as an additional conferee, or on the other hand, he might dispose of the dial tone and release the register by a switchhook flash. He now has all the functions and controls of the confei ence originator including the ability to initiate attendar action resulting in addition of a central office trunk ca provided, of course, that port 5 is available for such pu pose. It will be understood, however, that port 0 canno be again seized during the time of the current conferenc connection.

Other stations remaining in the conference connectio can assume the status of conference controller in a man ner similar to that just described, provided port 0 and on additional port are vacant.

*Disconnect conditions*

For purposes of further description, various disconnec conditions will now be assumed.

First, it will be assumed that with the conference orig inator still in control and with three or more stations stil in conference, an added station disconnects by going on hook. When the added station, assumed to be the confere station connected to vertical 122, port 4, goes on-hook his line relay 3S4 is released. This opens the operate patl of relay 7BCH4 and starts the slow release of that relay Release of relay 7BCH4 opens at make contact 7BCH4-4(7) the holding path of relay 7BC4 and in turn, start the slow release of that relay. Relay 7BC4, released, in terrupts at make contact 7BC4–6(3) the connection o holding ground to sleeve lead 323 of vertical 122 whereb to release the associated holding magnet of the switch Whenever a conferee port is cleared by disconnect o the connected conferee station as just described, it be comes available for a new call by the conference origi nator or controller. A new call is always directed to th lowest number conference port having a released lin relay (2S- or 3S-).

In the above situation had the conference originato disconnected first, disconnection of the added statio would have resulted in release of relays 3S4, 7BCH4 an 7BC4 and of the holding magnet in the sequence described for the case where the originator is still in control. In this instance, however, we would have the additional circuit actions of operating and releasing the associated 5TP- relay and of operating and releasing rela 5TPDK during the disconnect sequence.

Let us assume now that the conference originator disconnects, leaving only two conferee stations connecte to the conference loop; in this situation hang-up of eithe station will release the conference control circuit. It wil be assumed for purposes of illustration that the two remaining conferee stations are connected to ports 2 and 3 and that the station connected to port 2 now goes on-hook.

When the conferee station connected to port 2 goes on-hook and opens the station loop, relays 2S1, 7BCH2 an 7BC2 and the link hold magnet associated with vertica 119 release in sequence. Also, during this sequence, relay 5TP2 is operated and released and relay 5TPDK is released and reoperated. Since, as pointed out above, the conference originator is disconnected, relay 6ONA is released so that the holding path for relay 7BC3 to ground at make contact 6ONA–1(7) is opened. Release of relay 7BC2, as described above, opens the alternate holding path for relay 7BC3 previously established through make contact 7BC3–10(7) and the make contact of transfer pair 7BC2–1(7) from which it follows that release of relay 7BC2 is followed by release of relay 7BC3.

Relay 7BC3, released, interrupts at make contact 7BC3–6(3) the connection of holding ground to sleeve 314 of vertical 121 whereby to release the associated holding magnet, releases relay 3S3 by interrupting the holding path at the make contact of transfer pair 7BC3–5(3), and releases relay 7RV by interrupting the operate path at the make contact of transfer pair 7BC3–1(7).

Release of relay 3S3 is followed by release of relay 7BCH3, and release of relay 7RV is followed by release of relay 5BY previously held over the alternate path to ound at make contact 7RV–3(5). Release of relay 5BY eases relay 5TPDK by removing operating ground at ake contact 5BY–2(5) and at make contact 5BY–4(2) moves the make-busy ground from the sleeve of the iginating port 0. The conference control circuit is now stored to a normal idle condition and control port 0 is ailable for seizure by a new conference originator.

It will be assumed now that the conference originator es on-hook while a dial pulse register is attached to a nferee vertical, for example vertical 121 of port 3. When e conference originator goes on-hook and opens the stan loop, relay 2L releases and slow-release relay 6SRC arts to release as the operate path is open at the make ntact of transfer pair 2L–1(6). Relay 6SRC, released, leases relay 7CR3 by interrupting the holding path at ake contact 6SRC–7(7). Relay 7CR3, released, removes make contacts 7CR3–3(3) and 7CR3–4(3) the short rcuiting path across tip 311 and ring 312 whereby to disiss the register connected thereto. Also, relay 7CR3, reased, closes the operate path of relay 7CRDK, which pon operating closes at the make contact of transfer pair CRDK–2(6) the operate path of relay 6D1.

Release of relay 6SRC also activates time delay circuit 23 by applying ground to lead 627 through the break ntact of transfer pair 6SRC–6(6). After the disconnect terval, of the order of 1.5 seconds, relay 6ONRL operes. Relay 6ONRL, operated, interrupts at break contact ONRL–1(6) the holding path of relay 6ON which reases and, in turn, releases 6ONA, 7CRDK, 6D1 and RRL. Relay 6ONA, released, releases relay 5TPDK at e make contact of transfer pair 6ONA–5(5), removes t make contact 6ONA–2(2) holding ground from the eeve of vertical 117 whereby to release the associated olding magnet of the switch, and deactivates time delay rcuit 623 by removing ground from line 627 at make ontact 6ONA–4(6); relay 6ONRL releases.

Relay 5BY operates following release of relay 6ONA hrough the break contact of transfer pair 6ONA–5(5) nd reconnects through make contact 5BY–4(2) ground o the sleeve of vertical 117 whereby to hold the conerence control number "busy." Also, operation of relay BY is followed by operation of relay 5TPDK from round on make contact 5BY–2(5) through the break conacts of respective transfer pairs of the 5TP relays.

If the conference originator goes on-hook while conected to the conference amplifier, the main disconnect equence is the same as that just described above when a ial pulse register is attached. However, there is additional circuit action which depends upon the busy condition of he conference ports.

In the event all ports are connected to stations, that is ll are in a busy condition, operation of relay 6D1 will omplete at make contact 6D1–3(7) the operate path of elay 7D9W which thereupon operates in preparation for applying an "all ports busy" tone signal. The tone is not applied to the conference loop, however, since the path hrough the right hand windings of repeat coil 2T1 is open at make contact 2L–2(2) of the line relay. Relays 7D9W and 6D1 release following release of relay 6ON.

An additional circuit action involved in the "all ports busy" situation is the operation of relay 5FOM which follows the release of relay 6SRC and resultant closure of he operate path at the break contact of transfer pair 5SRC–5(5). Operation of relay 5FOM is preparatory to flashing the trunk recall lamp at the attendant's console n the event a central office trunk is connected to port 5 as described above.

The situation has been described above where the conferee station connected to port 3 assumed the status of conference controller; it will be assumed now that in such situation the station while in control of the conference leaves the connection by going on-hook. Line relay 2L now releases, it being remembered that this relay had been operated over lines 241 and 242 and through the closed station loop reached through vertical 121.

Relay 2L, released, operates relay 6D1 by closing the operate path at break contact 2L–3(6), and also starts the release of relay 6SRC by opening the operate path at the make contact of transfer pair 2L–1(6). Now, assuming that one port is idle and, further, that the idle port is port 2, operation of relay 6D1 will cause operation of relay 7CR2 by closing the operate path at the make contact of transfer pair 6D1–2(7); this is in preparation for adding a conferee station at port 2. Operation of relay 7CR2 is followed by release of relay 7CRDK since the operate path is opened at the break contact of transfer pair 7CR2–1(7); relay 7CRDK, released, releases, in turn, relay 6D1 since the operate path is opened at the make contact of transfer pair 7CRDK–2(6). However, the on-hook condition at the controlling station allows the disconnect sequence to continue, due to the release of relay 6SRC and closure of ground to lead 627, through the operation of relay 6ONRL, release of relays 6ON and 6ONA and subsequent release of relay 6ONRL.

Relay 6ON, released, in addition to releasing relay 6ONA, releases relay 7CR2 by removing ground from the operate path at make contact 6ON–3(7), and also releases relays 5TE and 5TEA by removing the holding ground at make contact 6ON–12(5). Relay 5TE, released, removes at make contact 5TE–1(5) the holding ground for relay 5TPDK which releases since the operate path is open at the break contact of transfer pair 5TP3–3(5), relay 5TP3 having operated when the conferee station connected to port 3 assumed control. Release of relay 5TEA also removes holding ground at make contact 5TEA–3(2) from line 243 and the lower winding of relay 3S3; relay 3S3 releases.

Release of relay 6ONA releases relay 5TP3 by interrupting the holding path at the make contact of transfer pair 6ONA–5(5) and operates relay 5BY through the break contact of the same transfer pair. Relay 5TPDK is now operated from ground at make contact 5BY–2(5) and the break contacts of the transfer pairs of relays 5TP-. With port 2 idle as described above, relay 5TP3 now reoperates from ground, make contacts 7RV–3(5), 5BY–1(5) and 5TPDK–3(5), break contacts 5TEA–11(5), 7BCH2–5(5), and 3S3–2(5), make contact 7BC3–7(5), winding of relay 5TP3 to battery. This is a momentary operation since relay 5TP3 is released upon release of relay 7BC3 following release of relay 7BCH3.

At the end of the disconnect sequence as described above for a conferee station which has assumed conference regulator status, the conference circuit is in the same condition as that which prevails following disconnect of the original controller. Any conferee station still connected to the conference loop may assume control by flashing his switchhook.

While in accordance with the specific illustrative embodiment described above, the conference ports are connected to respective verticals of a crossbar switch, it will be understood that the arrangement could be used in connection with other types of switches, in which event the ports would be connected to respective groups of the switch terminals.

It is to be understood that the above-described arrangements are illustrative of the application of the principles of the invention. Numerous other arrangements may be devised by those skilled in the art without departing from the spirit and scope of the invention.

What is claimed is:

1. In an automatic telephone switching system, a private branch exchange, an attendant's position and a plurality of customer stations associated with said private branch exchange, a conference circuit also associated with said private branch exchange and having a plurality of conference ports, said conference ports normally being accessible only through connection of selected ones of said customer stations, means under control of an initial one of said customer stations for connecting said station to a first of said conference ports and for connecting other selected stations to others of said conference ports in turn, a central office trunk terminating at said private branch exchange, connection of said central office trunk being controlled through said attendant's position to the exclusion of said customer stations, and means controlled by said initial one of said customer stations for rendering one of said conference ports temporarily accessible for connection of said central office trunk under control of said attendant's position.

2. In an automatic telephone switching system, the combination defined by claim 1 further characterized in that said last-mentioned means includes a normally open auxiliary path connected to said one of said conference ports and a relay effective when operated to close said auxiliary path.

3. In an automatic telephone switching system, the combination defined by claim 2 further including means for operating said relay effective upon the dialing of the attendant's code by said initial one of said customer stations.

4. In an automatic telephone switching system, a private branch exchange, an attendant's position and a plurality of customer stations associated with said private branch exchange, a conference circuit also associated with said private branch exchange and having a plurality of conference ports, a plurality of groups of switch terminals, each of said conference ports being connected to one of said groups of switch terminals, a first line relay associated with a first of said groups of switch terminals and the connected conference port, a plurality of other line relays each normally associated with a respective one of the other groups of switch terminals and the respectively connected conference port, means for connecting a first of said customer stations to said first of said groups of switch terminals, means controlled by said first of said customer stations for controlling operation of said first line relay, means controlled by said first line relay for controlling the connection of others of said customer stations to others of said groups of switch terminals in turn, and means for operating said other line relays under control of the respective customer station connected to the switch terminal group associated with the respective other line relay.

5. In an automatic telephone switching system, the combination defined by claim 4 further characterized in that said means controlled by said first line relay includes a first relay chain circuit, and means controlled by a respective one of said other line relays for controlling the operate path of each of the relays of said first chain circuit.

6. In an automatic telephone switching system, the combination defined by claim 5 further characterized in that said means controlled by said first line relay also includes a second relay chain circuit and means controlled by respective relays of said first relay chain circuit for controlling the selective operation of relays of said second chain circuit.

7. In an automatic telephone switching system, the combination defined by claim 4 further including means for transferring control of said first line relay from said first of said customer stations to another of said customer stations and for disconnecting the other line relay normally associated with said other station.

8. In an automatic telephone switching system, the combination defined by claim 4 further including a busy tone source, an impulse dial at said first of said customer stations, and means effective upon said first station dialing a trunk access code for applying tone from said source to said first station.

9. In an automatic telephone switching system, the combination defined by claim 6 further including a locking path for each of the relays of said second relay chain circuit, and means controlled by respective ones of said other line relays for controlling each of said locking paths.

10. In an automatic telephone switching system, the combination defined by claim 7 further characterized in that said last-mentioned means includes an auxiliary operate path for said first line relay and means for closing said path through the station loop of said other station.

11. In an automatic telephone switching system, the combination defined by claim 7 further characterized in that said transferring means is also effective to subsequently transfer control of said first line relay from said other station to still another of said customer stations.

12. In an automatic telephone switching system, the combination defined by claim 7 further characterized in that the means for controlling the connection of others of said customer stations to others of said group of switch terminals in turn includes means for connecting a bridging path across said others of said groups of switch terminals in turn.

13. In an automatic telephone switching system, the combination defined by claim 10 further characterized in that said means for closing said path through the station loop of said other station includes a relay and means for operating said last-mentioned relay controlled by said other line relay normally associated with said other station.

14. In an automatic telephone switching system, the combination defined by claim 12 further characterized in that said means for transferring control of said first line relay to said other of said customer stations includes a holding ground path for each of said customer stations and means for closing the path of said other station to which control of said line relay is transferred.

15. In an automatic telephone switching system, the combination defined by claim 14 further characterized in that said last-mentioned means includes a relay controlled by the line relay normally associated with said other station.

16. In an automatic telephone switching system, a private branch exchange, an attendant's position and a plurality of customer stations associated with said private branch exchange, a conference control circuit also associated with said private branch exchange and having a plurality of conference ports, a plurality of groups of switch terminals, each of said conference ports being connected to one of said groups of switch terminals, a conference amplifier having a plurality of conference amplifier ports, a first line relay associated with a first of said groups of switch terminals and the connected conference port, means for connecting a first of said customer stations to said first of said groups of switch terminals, means controlled by said first of said customer stations for controlling operation of said first line relay, a plurality of normally open circuits for connecting respective conference ports and conference amplifier ports, a terminating path normally connected across each of said last-mentioned circuits, and means controlled by said first line relay for closing said respective circuits and for disconnecting said terminating paths therefrom.

17. In an automatic telephone switching system, the combination defined by claim 16 further including additional means controlled by said first line relay for controlling the connection of others of said customer stations to others of said groups of switch terminals in turn, and means effective as each station is connected for connecting holding ground to the respective group of switch terminals.

18. In an automatic telephone switching system, the combination defined by claim 17 further characterized in that said last-mentioned means includes alternate paths associated with said first of said groups of switch terminals, means effective when said first of said customer stations is connected to said switch terminals for connecting holding ground thereto over the first of said ternate paths and means effective when said station is sconnected from said switch terminals and while a station is connected to at least one other of said groups of vitch terminals for connecting holding ground to said rst of said groups of switch terminals over the second f said alternate paths.

19. In an automatic telephone switching system, the ombination defined by claim 16 further including additional means controlled by said first line relay for controlling the connection of others of said customer stations ) others of said groups of switch terminals in turn, leans effective after all conference ports are occupied nd upon an attempt to connect an additional customer :ation thereto to apply a busy tone to said first group f switch terminals for transmission to said first of said ustomer stations.

20. In an automatic telephone switching system, the ombination defined by claim 19 further including means or preventing transmission of the busy tone through the onference amplifier to other connected stations.

21. In an automatic telephone switching system, the ombination defined by claim 20 further characterized n that said last-mentioned means includes a relay effective vhen released to disconnect the conference port associated with said first group of switch terminals from the onference amplifier.

22. In a private branch exchange telephone system, a plurality of extensions, a multiport conference circuit, neans for connecting a first extension as a conference controller to a first port of said conference circuit, and neans responsive to a signal from a second extension connected to a second port of said conference circuit after said first extension leaves the conference connection and another port of said circuit is idle for transferring control of the conference connection to said second extension.

23. In a private branch exchange telephone system, a plurality of extensions, a multiport conference circuit, an attendant's position, a trunk circuit extending to a central office and connection thereto being controlled by said attendant's position, means for normally preventing seizure of a port of said conference circuit by said position, and means controlled by a first extension connected to a first port of said conference circuit for disabling said last-mentioned means to permit connection of said trunk to a second port of said conference circuit under control of said position.

24. In a private branch exchange telephone system, a plurality of extensions, a multiport conference circuit, means for connecting a first extension as a conference controller to a first port of said conference circuit, a dial pulse register, means normally responsive to a momentary depression of the switchhook of said first extension for connecting said first extension to said dial pulse register to enable the connection of additional ones of said extensions to additional ports of said conference circuit, an attendant's position, a trunk extending to a central office and connectable to another port of said conference circuit by said attendant's position, means controlled by said first extension for enabling said attendant's position to connect said trunk to said other port of said conference circuit, and means responsive to a momentary depression of the switchhook of said first extension when said trunk has been connected to said other port and the remaining ports of said conference circuit are connected to extensions of the system for providing a flashing recall to said attendant's position.

References Cited

UNITED STATES PATENTS

| | | | |
|---|---|---|---|
| 1,626,034 | 4/1927 | Gardner | 179—18 |
| 3,133,994 | 5/1964 | Zarouni | 179—18 |

KATHLEEN H. CLAFFY, *Primary Examiner.*

WILLIAM C. COOPER, *Examiner.*